(12) United States Patent
Alodhayb et al.

(10) Patent No.: US 12,500,447 B1
(45) Date of Patent: Dec. 16, 2025

(54) RECTENNA INCLUDING GEOMETRIC DIODE AND BOW-TIE ANTENNA AND METHOD OF USE THEREOF

(71) Applicant: KING SAUD UNIVERSITY, Riyadh (SA)

(72) Inventors: Abdullah Nasser Alodhayb, Riyadh (SA); Ghada Ahmad Khouqeer, Riyadh (SA); Gaurav Jayaswal Jayaswal, Riyadh (SA); Palla Kishore Yadav, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/298,511

(22) Filed: Aug. 13, 2025

(51) Int. Cl.
  *H02J 50/00* (2016.01)
  *H01Q 1/24* (2006.01)
  *H02J 50/27* (2016.01)

(52) U.S. Cl.
  CPC ........... *H02J 50/001* (2020.01); *H01Q 1/248* (2013.01); *H02J 50/27* (2016.02)

(58) Field of Classification Search
  CPC .......... H02J 50/00; H02J 50/001; H02J 50/27; H01Q 1/24; H01Q 1/248
  See application file for complete search history.

(56) References Cited

U.S. PATENT DOCUMENTS

| | | | |
|---|---|---|---|
| 8,803,340 B2 | 8/2014 | Moddel | |
| 10,670,001 B2 | 6/2020 | Pinkerton | |
| 11,069,798 B2 | 7/2021 | Bramanti et al. | |
| 11,355,624 B2 | 6/2022 | Bramanti et al. | |

FOREIGN PATENT DOCUMENTS

CN 110752421 A 2/2020

OTHER PUBLICATIONS

Alharbi, Abdullah, et al. "Two-Dimensional Materials for Terahertz Emission." Trends in Terahertz Technology (2023).
Stearns, John, and Garret Moddel. "Simulation of Z-shaped graphene geometric diodes using particle-in-cell Monte Carlo method in the quasi-ballistic regime." Nanomaterials 11.9 (2021): 2361.

*Primary Examiner* — Robert L Deberadinis
(74) *Attorney, Agent, or Firm* — Nath, Goldberg & Meyer; Joshua B. Goldberg

(57) ABSTRACT

A system and method of harvesting energy are provided using a geometric diode and antenna. The geometric diode includes a start portion, end portion, and neck portion joining the start portion and end portion. The geometric diode tapers laterally inward at the neck portion, which defines the narrowest point of the geometric diode. The antenna includes first and second halves forming a bow-tie shape, with inner ends of the antenna contacting respective laterally opposite sides of the neck portion of the geometric diode. A method of using the geometric diode includes harvesting electromagnetic energy such as infrared, microwave, or terahertz radiation through the antenna and into the geometric diode. Example materials used include gold for the antenna. The geometric antenna may be formed from tungsten disulfide, boron nitride, perovskite, molybdenum disulfide, or a MXene nanomaterial composed of transition metal carbides, nitrides, or carbonitrides.

20 Claims, 37 Drawing Sheets

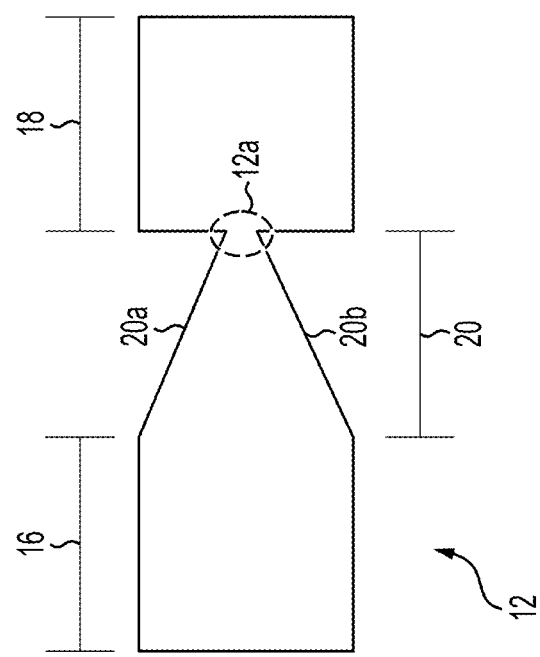
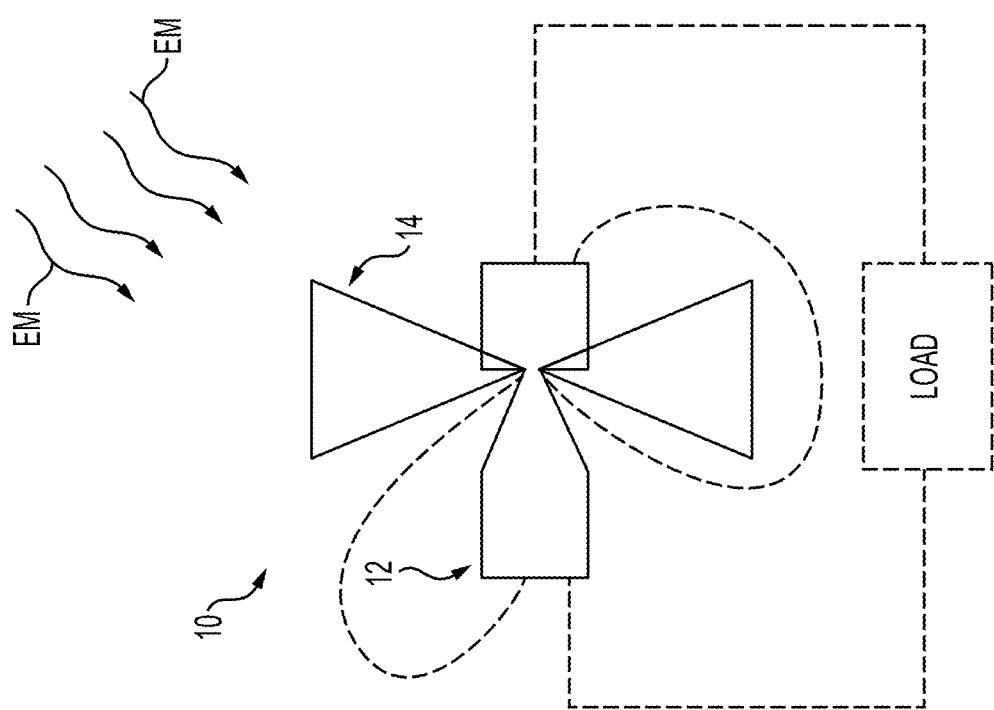
FIG. 1B
FIG. 1A

RECTENNA INCLUDING GEOMETRIC DIODE AND BOW-TIE ANTENNA AND METHOD OF USE THEREOF

BACKGROUND

Field

The disclosure of the present patent application relates to rectifying antennas, also referred to as rectennas, and particularly to a rectenna using a bow-tie shaped antenna coupled with a geometric diode.

Description of Related Art

The search for new safe, renewable, and environmentally-friendly sources of energy is ongoing. Prospective energy sources include infrared (IR) energy, extracted from ambient waste heat, which is highly abundant and has good potential as a renewable energy source. Waste heat energy generally falls within a wavelength spectrum of 2-11 μm corresponding to tens of Terahertz (THz) in frequency. IR energy, which behaves as a very high-frequency electromagnetic wave, can be readily scavenged by a receiving antenna and rectified into direct (DC) current using a rectifying diode. The combination of receiving antenna and rectifying diode is called a rectenna, which is more commonly known for energy harvesting of microwaves and radiowaves, but lesser known for gathering energy at THz and infrared frequencies.

Rectennas capable of harvesting IR and THz energy offer an energy source that is both sustainable and continuously available 24 hours a day without environmental pollution. However, the design of such rectennas requires extremely small antennas on the order of microscale dimensions with nanoscale gaps and ultra-high-speed diodes capable of functioning at THz and IR frequencies. Therefore, conventional semiconductor-based diodes are unsuitable for operation in the THz and IR frequency range, while metal-insulator-metal (MIM) diodes have been explored as a possible solution. However, rectenna systems using MIM diodes have drawbacks. The performance of such systems critically depends on the properties of an ultra-thin oxide-insulator layer. In order to achieve a cutoff frequency in tens of THz, an oxide layer with low permittivity and very smooth surface is required for reliable operation of the diode. The tunnel oxide layer is very thin (1-3 nm) for electron tunnelling to reduce the diode resistance. However, the inclusion of the oxide layer enhances capacitance and has adverse effects on both cut-off frequency and rectification efficiency. In addition, deposition techniques/conditions of MIM diodes often modify the oxide layer characteristics and can lead to challenges in consistent and repeatable performance.

Another approach for rectenna systems harvesting THz energy is through a fully planar structure called a geometric diode. In contrast to MIM diodes, geometric diodes are planar, not vertically stacked, in structure, and hence their capacitance is very low. However, geometric diodes rely on materials exhibiting a long mean free path, and for this reason, graphene is typically the material of choice. Other materials, though, may offer benefits with regards to bandgap, conductivity and mobility. Furthermore, typical geometric diodes include electrodes placed on the ends of the diodes, which may be less than ideal for electromagnetic field generation and inducing motion among the charge carriers.

Thus, a rectenna including a geometric diode and bow-tie antenna solving the aforementioned problems is desired.

SUMMARY

The present disclosure is directed towards a rectenna including a geometric diode and an antenna. The geometric diode includes a start portion and end portion. A neck portion joins the start portion and end portion, and the geometric diode tapers laterally inward at the neck portion between the start and end portions. The neck portion further defines the narrowest point on the geometric diode. The antenna includes first and second halves forming a bow-tie shape. The first and second halves include an outer end and an inner end. The outer ends of the first and second halves of the antenna taper laterally inward to the inner ends, and the inner ends of the antenna contact respective laterally opposite sides of the neck portion of the geometric diode. In addition, the inner ends of the antenna may form electrode contacts on respective laterally opposite sides of the geometric diode at the narrowest part of the geometric diode.

In certain embodiments, various pre-selected materials may be used for the antenna and geometric diode. In a non-limiting example, the antenna may be formed of gold. In other non-limiting examples, the geometric diode may be formed of tungsten disulfide, boron nitride, perovskite, or molybdenum disulfide. In another embodiment, the geometric diode may be formed of a MXene nanomaterial composed of transition metal carbides, nitrides, or carbonitrides.

In other embodiments, a method of harvesting energy is provided by the present disclosure. The method includes providing an antenna having a bow-tie shape and a geometric diode. Energy is harvested through the antenna. A center of the antenna contacts a tapered neck of the geometric diode, and the geometric diode includes a start portion, an end portion, and the tapered neck, wherein the geometric diode tapers laterally inward at the neck portion between the start portion and the end portion, and the neck portion defining the narrowest point of the geometric diode.

The method of harvesting energy may include harvesting various types of electromagnetic energy, including infrared (RF) radiation (300 GHz to 430 THzw), microwave radiation (300 MHz to 300 GHz), and terahertz radiation (100 GHz-10 THz).

In a non-limiting embodiment, the antenna used in the method of harvesting energy may be formed of gold. The geometric diode used in the method of harvesting energy may be formed of tungsten disulfide, boron nitride, perovskite, or molybdenum disulfide. In other embodiments, the geometric diode may be formed of a MXene nanomaterial composed of transition metal carbides, nitrides, or carbonitrides.

These and other features of the present subject matter will become readily apparent upon further review of the following specification.

BRIEF DESCRIPTION OF DRAWINGS

FIG. 1A shows a diagram of a rectenna using a geometric diode and antenna.

FIG. 1B shows the geometric diode used in the rectenna of FIG. 1A.

Similar reference characters denote corresponding features consistently throughout the attached drawings.

DETAILED DESCRIPTION

Figure 1D:
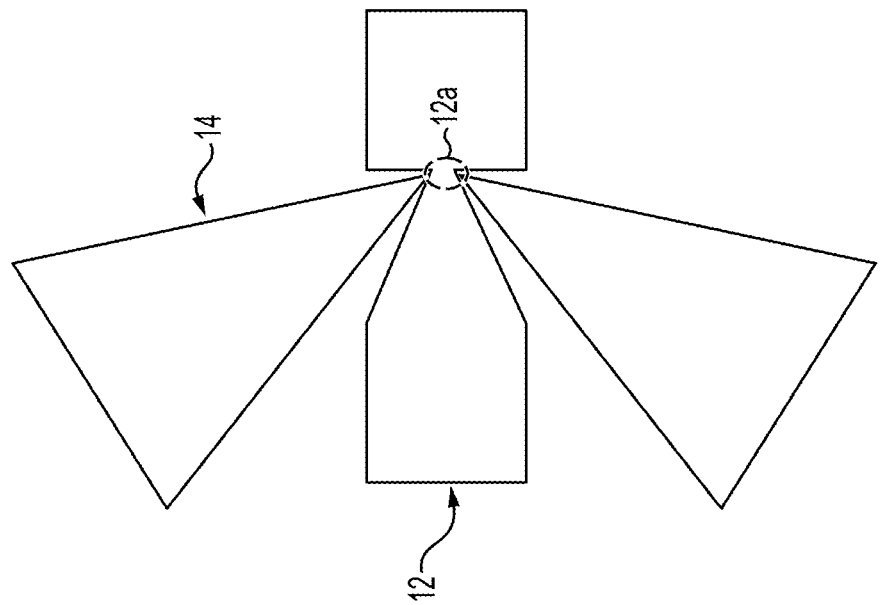
FIG. 1D shows another embodiment of a rectenna using a geometric diode and antenna.
Figure 1C:
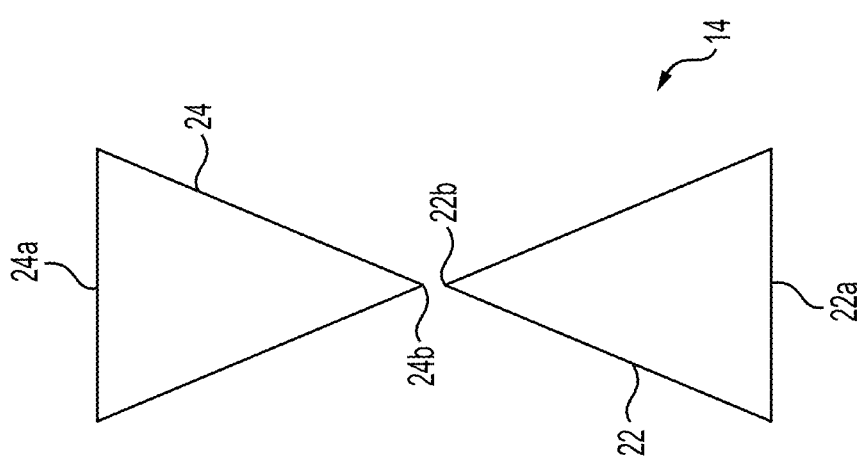
FIG. 1C shows the antenna of the rectenna used in FIG. 1A.

With reference to FIGS. 1A-D, a rectenna 10 is provided including a geometric diode 12 and an antenna 14. The geometric diode 12 includes a start portion 16 and end portion 18. A neck portion 20 joins the start portion 16 and end portion 18, and the geometric diode tapers laterally inward at the neck portion 20 between the start portion 16 and end portion 18. The neck portion 20 defines the narrowest part 12a of the geometric diode. The antenna 14 includes respective first and second halves 22, 24 forming a bow-tie shape. In geometry, a "bow-tie" shape or structure is defined by two opposing triangles tapering inward to a center vertex. The respective first and second halves 22, 24 include respective outer ends 22a, 24a and inner ends 22b, 24b. The outer ends 22a, 24a of the first and second halves 22, 24 taper laterally inward to the inner ends 22b, 24b, and the inner ends 22b, 24b serve as electrodes of the antenna 14 and contact respective laterally opposite sides 20a, 20b of the neck portion 20 of the geometric diode 12. In addition, the inner ends 22b, 24b of the antenna may contact respective laterally opposite sides 20a, 20b of the geometric diode 12 at the narrowest part 12a of the geometric diode 12.

Antenna 14 is positioned at the neck 20 of the geometric diode 12 to achieve maximum field enhancement and achieve higher efficiency. The electromagnetic field generated is directed at the tip of the antenna 14 thus enhancing rectification at the neck 20 of geometric diode 12. The bow-tie shape of antenna 14 is particularly suited for field generation due to the geometry which leads to extreme field concentrations at the inner ends 22b, 24b. FIG. 1A provides an embodiment in which the inner ends 22b, 24b of antenna 14 are oriented orthogonally to neck 20 of diode 12, resulting in a slight overlap onto end portion 18 of diode 12, the overlap being small enough to have a negligible effect on performance as shown through the analysis performed. However, FIG. 1D provides an alternative embodiment in which the inner ends 22b, 24b are oriented at angles towards neck 20 of the diode 12, thus avoiding any overlap between the antenna 14 and the diode 12.

In certain embodiments, various pre-selected materials may be used for the antenna 14 and geometric diode 12. In a non-limiting example, the antenna 14 may be formed of gold (Au), silver (Ag), copper (Cu), or other conductive metal. In other non-limiting examples, the geometric diode 12 may be formed of tungsten disulfide ($WS_2$), boron nitride (BN), perovskite/calcium titanate ($CaTiO_3$), or molybdenum disulfide ($MoS_2$). In another embodiment, the geometric diode may be formed of MXenes, which are a family of essentially two-dimensional compounds composed of transition metal carbides, nitrides, or carbonitrides. MXenes are represented by the general formula $M_{n+1}X_nT_x$. The "M" represents a transition metal, "X" is carbon or nitrogen, and "T" represents surface terminations like oxygen, hydroxyl, or fluorine. MXenes are known for their unique combination of properties, including high electrical conductivity, hydrophilicity, and tunable surface chemistry.

Materials Referral

Throughout the disclosure, various chemical names and chemical formulas and connotative names may be used interchangeably when referring to a particular material. For instance, throughout the disclosure, perovskite may be also referred to as calcium titanate or $CaTiO_3$. Tungsten disulfide may be interchangeably referred to as $WS_2$. Molybdenum disulfide may be interchangeably referred to as $MoS_2$. Boron nitride may be interchangeably referred to as BN. MXene may be interchangeably referred to as a nanomaterial or compound composed of transition metal carbides, nitrides, or carbonitrides.

Still referring to FIGS. 1A-D, a method of harvesting energy is further provided by the present disclosure. The method includes harvesting electromagnetic energy EM (See FIG. 1A) through an antenna 14 of a bow-tie shape, wherein a center of the antenna 14 contacts a tapered neck 20 of a geometric diode 12, wherein the geometric diode 12 includes a start portion 16, an end portion 18, and the tapered neck 20, wherein the geometric diode 12 tapers laterally inward at the neck portion 20 between the start portion 16 and the end portion 18. The neck portion 20 defines the narrowest part 12a of the geometric diode 12. The method of harvesting energy may include harvesting various types of electromagnetic energy EM, including infrared (RF) radiation (300 GHz to 430 THz), microwave radiation (300 MHz to 300 GHz), and terahertz radiation (100 GHz-10 THz).

Figure 2:
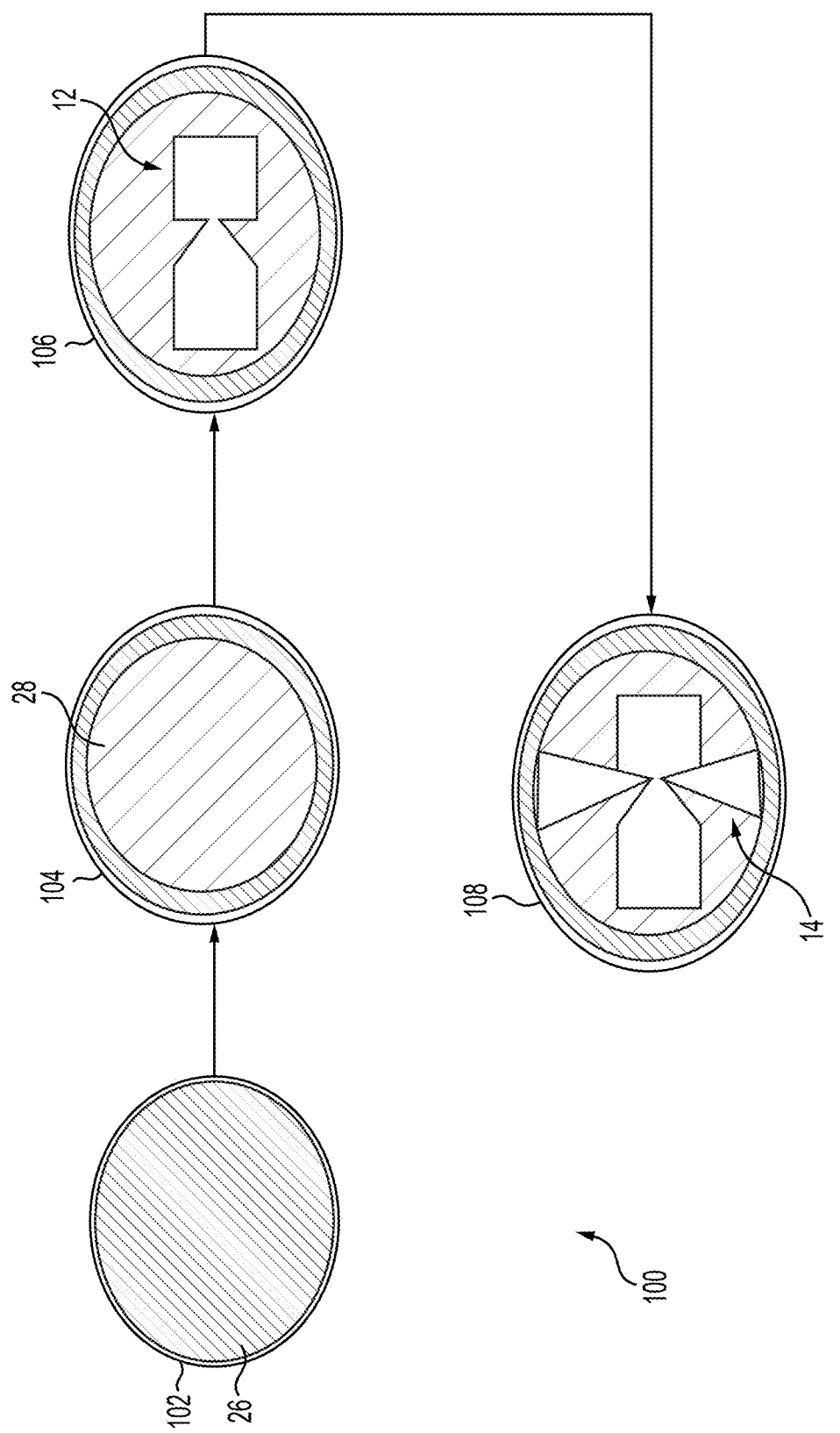
FIG. 2 is a diagram of manufacturing steps used to form a rectenna including a geometric diode and antenna.

With reference to FIG. 2, certain steps in a method 100 of forming a rectenna are shown. In a first step 102, a substrate 26 is provided. Common substrates include silicon dioxide ($SiO_2$), sapphire, or other insulating materials. The surface of the substrate 26 may be cleaned and coated with a buffer layer such as aluminum oxide ($Al_2O_3$) to enhance adhesion or reduce defects. In a second step 104, a two-dimensional layer 28 such as a semiconductor or conductor is deposited onto the substrate 26 through a method such as chemical vapor deposition, physical vapor deposition, spin coating or drop casting. In a third step 106, the geometric diode 12 is formed through a combination of lithographic printing, etching and electrode formation. The lithographic printing may be, for example, electron beam lithography (EBL) or photolithography used to pattern the asymmetric geometry of the geometric diode 12. Reactive ion etching or wet etching may be used to define the final diode structure. Electrode formation may include deposition of metal contacts through evaporation or sputtering to form electrode contact points on the diode. In a fourth step 108, the antenna 14 is formed through a similar combination of lithographic printing, etching and electrode formation/metal deposition as the geometric diode 14.

Experimental Modelling

In the development of the present disclosure, a detailed simulation was conducted for assessing the performance of geometric diodes based on various two-dimensional materials including: tungsten disulfide ($WS_2$), MXene, boron nitride (BN), perovskite ($CaTiO_3$), and molybdenum disulfide ($MoS_2$). Current-Voltage (IV) characteristics were observed for neck widths ranging from 2 nm to 100 nm to observe key parameters of zero-bias resistance and rectification efficiency, and study variations with different neck widths. In particular, the unique electronic properties of each material were observed, including: high electron mobility in WS$_2$, exceptional electrical conductivity in MXene, wide bandgap and thermal stability in BN, photovoltaic capabilities in perovskite, and a direct bandgap in MoS$_2$. The unique properties of the various materials provide useful insights into the potential of these materials in supporting rectification of terahertz frequencies for various applications. The results of the simulation emphasize a strong dependence of performance metrics on material choice and neck width and thus open a route to geometric diode design optimization for the improvement of rectification efficiency and application-specific demands within terahertz rectennas.

Concept and Working Principle

Unlike conventional diodes that mainly rely on junctions or potential barriers, the geometric diode rectifies AC signals into DC based solely on its asymmetric geometry. The charge carriers move forward through the narrow neck, creating a forward current. These carriers are reflected at the central vertical wall of the diode in the reverse direction, which results in a current far weaker in the reverse direction in comparison with the current in the forward direction. As such, the asymmetry of the current moving forward and backward brings about the rectifying behavior of the diode. Quasi-ballistic or ballistic transport is essential for motion in which geometry mainly determines the direction and rate of the charge carriers. Therefore, the neck width of the geometric diode has to be about the same size, or smaller, than the mean free path of the material of the diode.

Monte Carlo Simulation

The modelling approach used was a Monte Carlo algorithm where the Drude-like transport of the carriers is coupled with momentum relaxation due to scattering events. A device geometry is defined for the diode and antenna and an applied input voltage across the electrodes at the neck of the diode sets up a constant geometry-dependent electric field. Charged carriers, representative of a number of electrons, are generated at random locations, each with some random-directed velocity equal to the Fermi velocity VF. The carriers move under the influence of the electric field with their momentum changing accordingly. While hitting a device boundary, carriers are specularly reflected. If a carrier passes an electrode, a counter will be incremented and a new carrier injected from the other electrode. When a carrier covers a distance equal to the mean free path, it was assigned a new random velocity, which was repeated until the end of a simulation. Then, the current is calculated using the counter and total time of simulation.

The simulation began by defining the diode boundaries in MATLAB and generating a triangular mesh, where nodes represent discrete points for calculating charge concentration, electric potential, and electric field. Macroparticles, each representing multiple electrons (typically 100 to 200), are randomly scattered across the device. These particles are initially assigned to the nearest three mesh nodes based on distance, establishing the initial charge density. To simulate electron collisions, each macroparticle is assigned a random time interval for momentum relaxation, sampled from an exponential decay distribution with $\tau = \lambda MFP/VF$, representing the average time between collisions. The input voltage is applied as a boundary condition, and MATLAB's PDE package was employed to solve Poisson's equation, determining the electric field that influences particle movement. The field's effect on each particle is recalculated at each timestep, dt, as particles move, collide, and reflect within the boundaries, ensuring momentum relaxation statistics are followed.

The timestep and mesh size must be such that potential gradients at geometrical constrictions are resolved, thus avoiding exaggerated current simulations. In the present case, mesh elements are finest at constrictions and coarsest at electrodes. The simulation updates particle positions and velocities, recomputes the charge density, and then recalculates the total amount of charge passing through the device in order to calculate the current, I. If at any moment, the collision counter of a particle becomes negative, in that case, its momentum is reset with a new velocity so that the momentum relaxation becomes conservation. Here, for all simulations, the timestep has been chosen as $dt=\tau/10$, so that a compromise between accuracy and computational cost is reached. The scheme is close to the Particle-in-Cell algorithms, which allow effective calculation of inter-particle interactions by spatial charge density distribution and efficient modelling of device geometries.

Electrical Characterization

A detailed simulation was conducted of the performance of geometric diodes with various materials such as tungsten disulfide (WS$_2$), MXene, boron nitride (BN), perovskite (CaTiO$_3$), and molybdenum disulfide (MoS$_2$). Current-Voltage (IV) characteristics, as a function of neck width running from 2 nm to 100 nm, were computed, and some of the key parameters that include zero-bias resistance and rectification efficiency were observed with their dependencies on neck width. The following table summarizes the relative permittivity, mean free path, and Fermi velocity values for the five materials studied, including tungsten disulfide (WS$_2$), MXene, boron nitride (BN), perovskite (CaTiO$_3$), and molybdenum disulfide (MoS$_2$).

TABLE 1

| Material | Mean Free Path (nm) | Relative Permittivity | Ferm Velocity (m/s) |
| --- | --- | --- | --- |
| Tungsten Disulfide (WS$_2$) | 30 | 5 | $10^6$ |
| MXene | 10 | 5.5 | $10^7$ |
| Boron Nitride (BN) | 100 | 4.5 | $10^5$ |
| Perovskite (CaTiO3) | 130 | 6 | $10^6$ |
| MoS$_2$ (Molybdenum Disulfide) | 20 | 7 | $10^6$ |

Figure 3A:
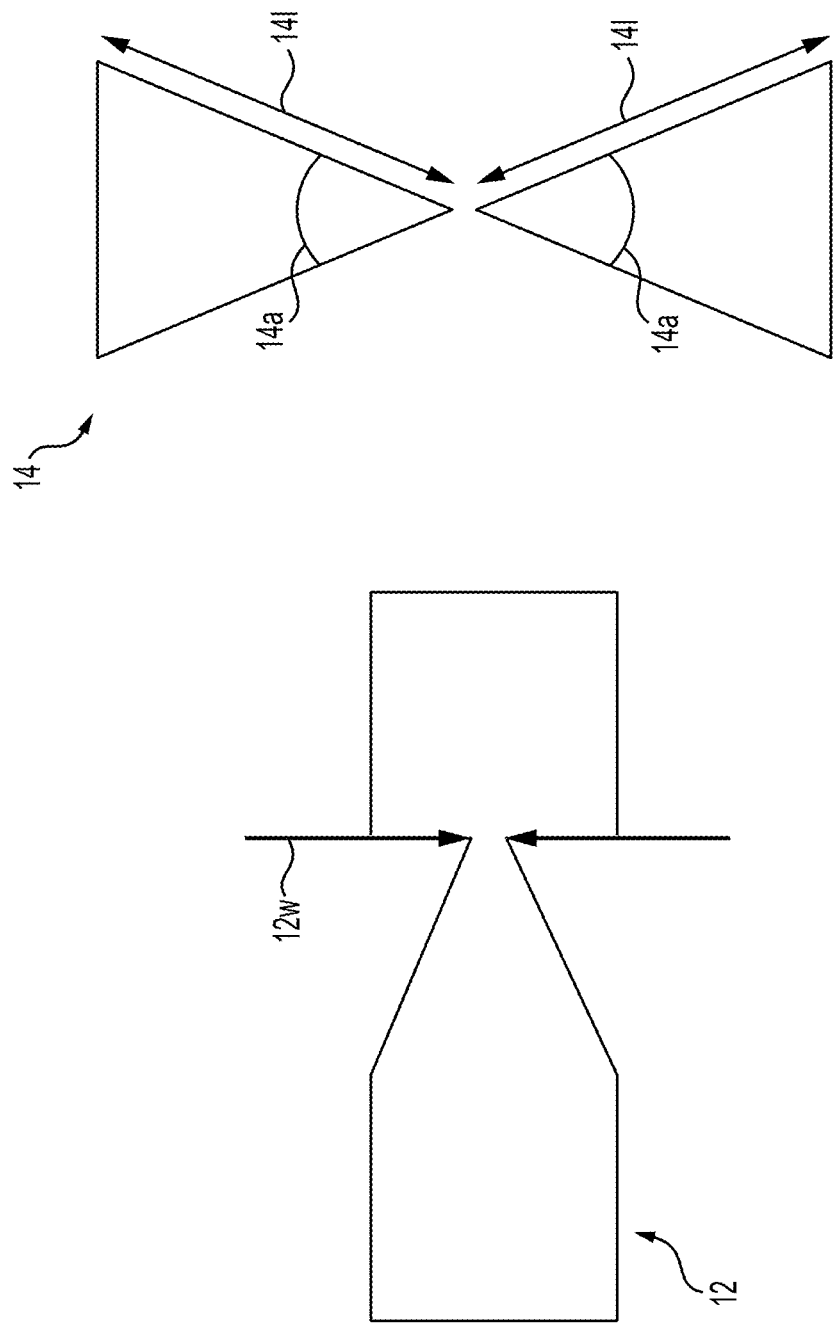
FIG. 3A is a diagram showing relevant size areas for a geometric diode and antenna used in a simulation analysis.
Figure 3B:
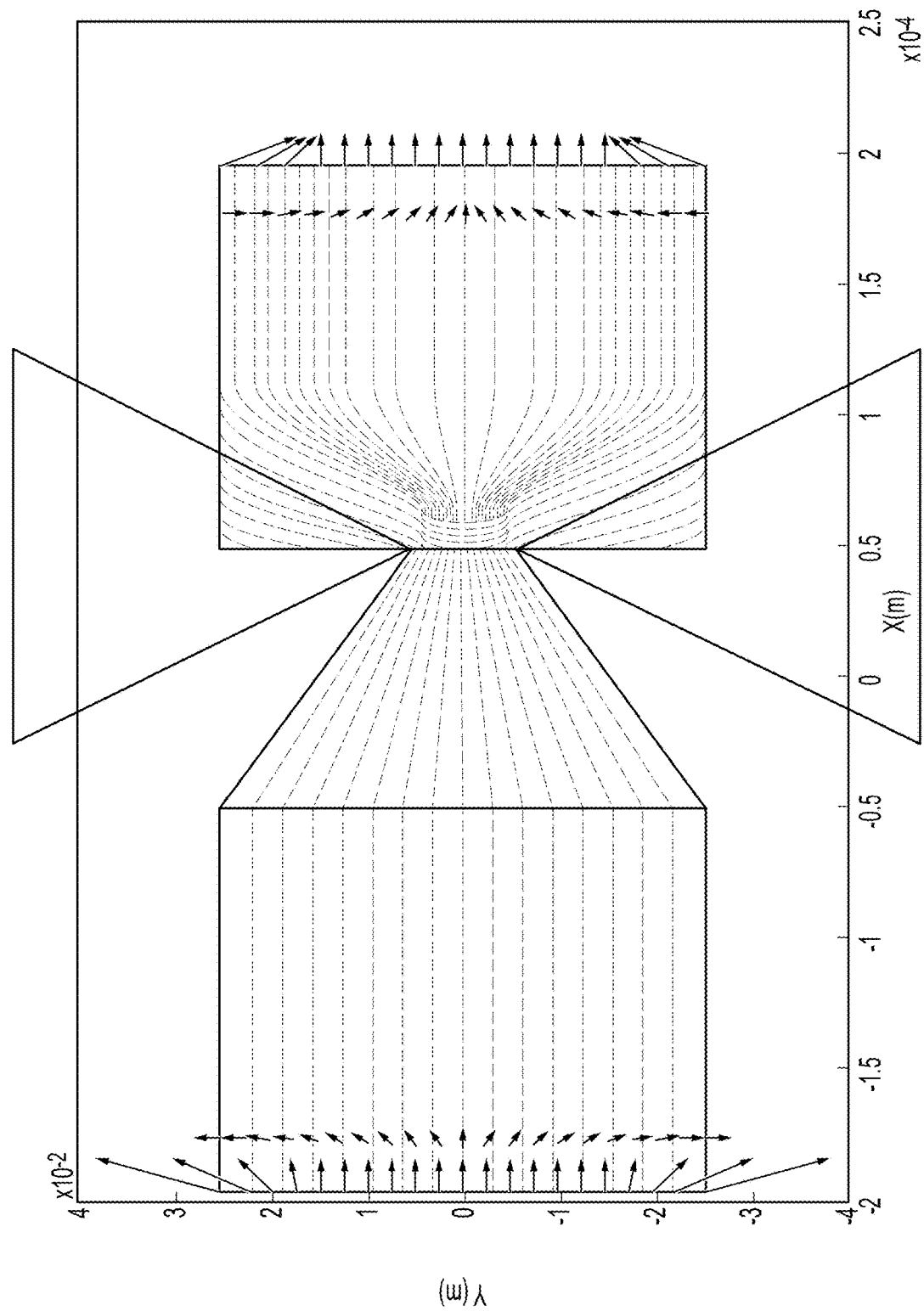
FIG. 3B is a diagram showing direction of charge carriers and magnetic fields across a geometric diode and antenna used in a particle-in-cell simulation.

With reference to FIGS. 3A-B, the simulations undertaken included a variation in the narrowest neck width 12w of the geometric diode 12, in accordance with the variation in mean free path lengths of the materials analyzed. The arm length of 141 (shown in FIG. 3A) of the bowtie antenna 14 is typically designed to resonate at the desired THz frequency. The target wavelength (2) for the study was 10.8 μm (i.e. 28.3 THz). In order to achieve ideal impedance matching, the antenna arm length 141 has to be 24. Thus, the antenna dimensions used in the study were 2.7 μm for arm length 141 and the antenna angle 14a was 60°. The metal thickness/depth of the antenna 14 used in the simulation was 100 nm. The material of the antenna 14 was chosen to be Gold (Au) due to the low skin depth and minimal resistive losses at high frequencies.

As shown in FIG. 3B, a visualization of a particle-in-cell (PIC) simulation for an inverse-arrowhead diode with 100 macroparticles is provided. In a first step, the particles are spread out across the mesh that outlines the diode's shape. Next a partial differential equation solver calculates how the voltage is distributed throughout the diode with an applied input of 2V in the example shown. The arrows show the direction and magnitude of the electric field affecting the macroparticles.

Figure 4A:
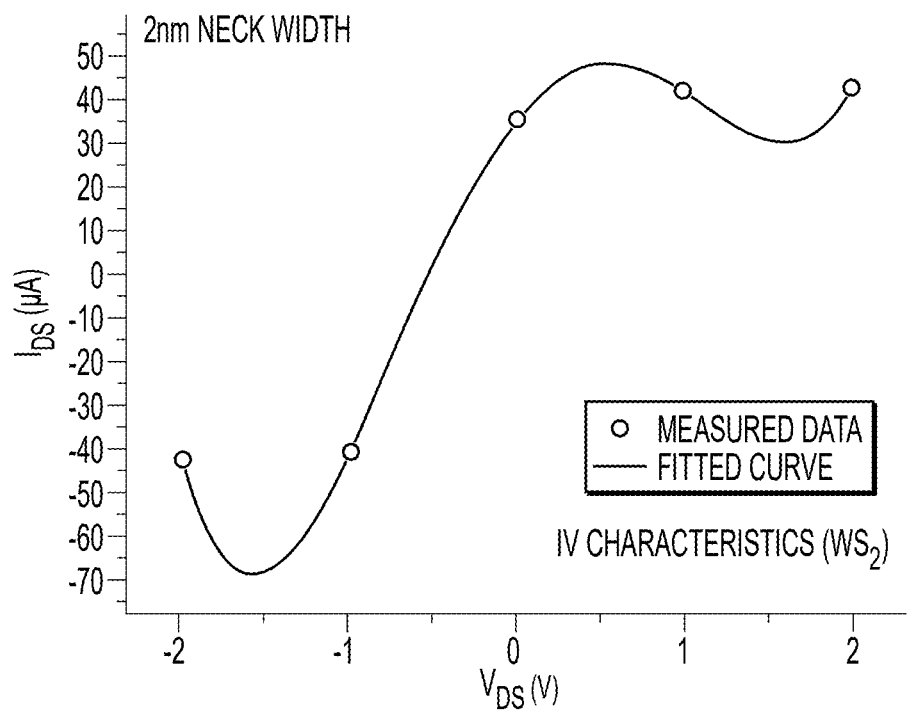
FIG. 4A is a chart showing current-voltage characteristics for a tungsten disulfide diode with a neck width of 2 nm.
Figure 4B:
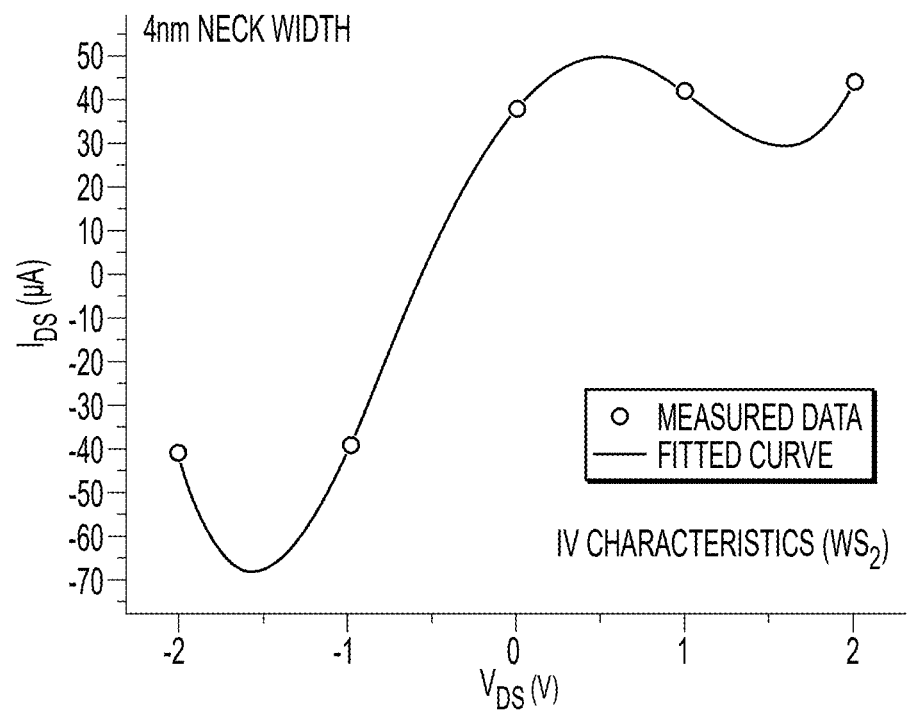
FIG. 4B is a chart showing current-voltage characteristics for a tungsten disulfide diode with a neck width of 4 nm.
Figure 4C:
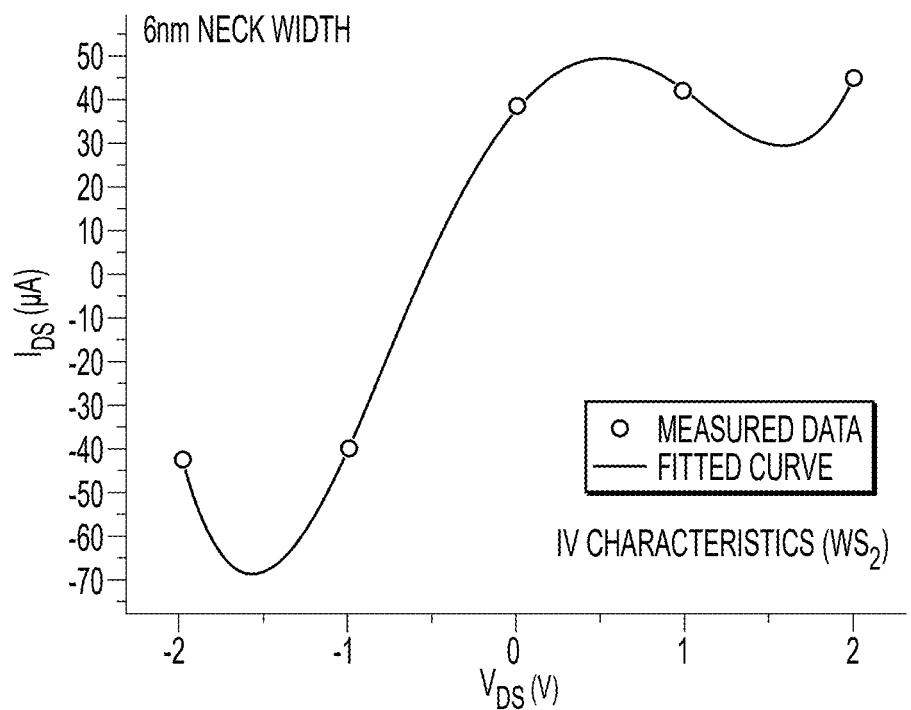
FIG. 4C is a chart showing current-voltage characteristics for a tungsten disulfide diode with a neck width of 6 nm.
Figure 4D:
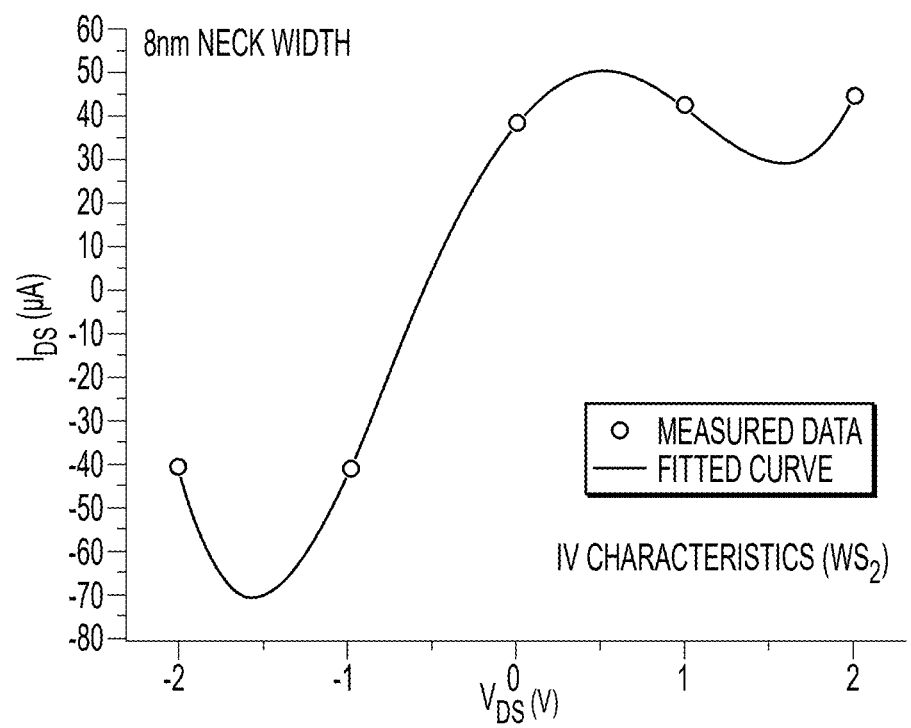
FIG. 4D is a chart showing current-voltage characteristics for a tungsten disulfide diode with a neck width of 8 nm.
Figure 4E:
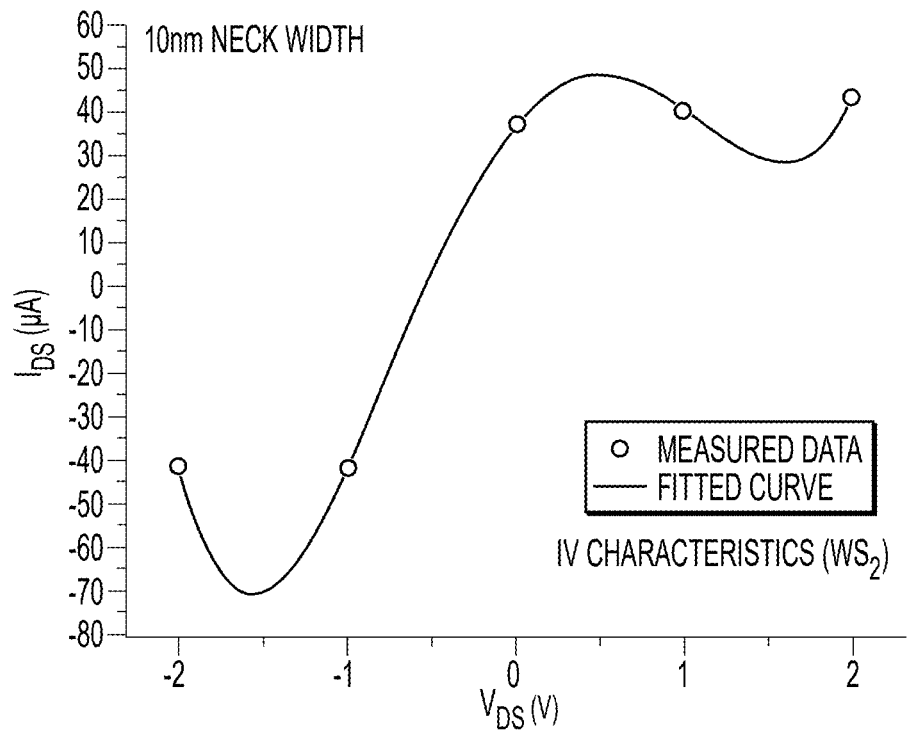
FIG. 4E is a chart showing current-voltage characteristics for a tungsten disulfide diode with a neck width of 10 nm.
Figure 4F:
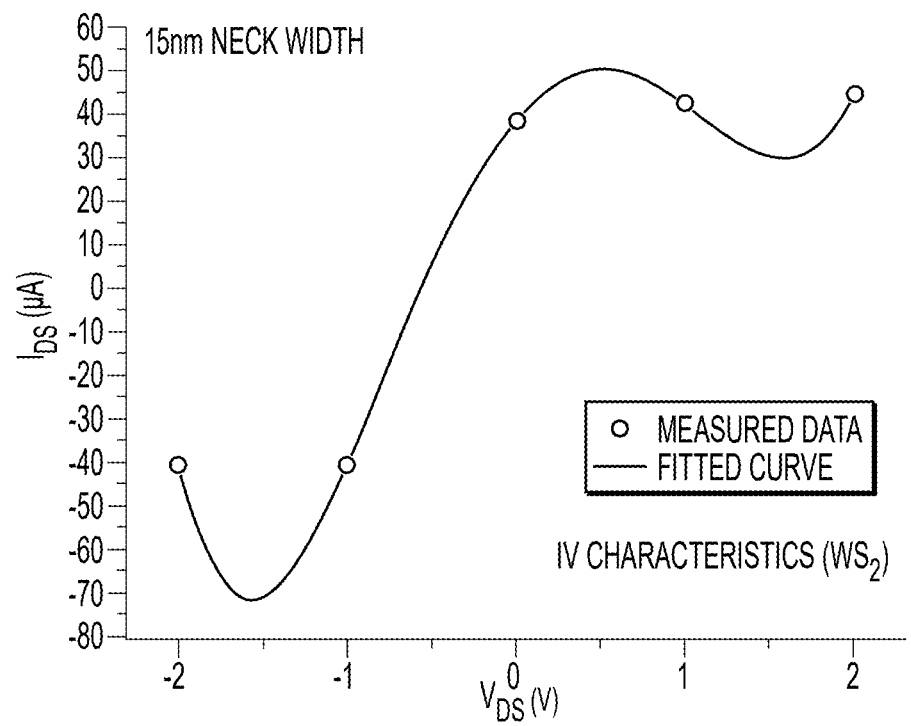
FIG. 4F is a chart showing current-voltage characteristics for a tungsten disulfide diode with a neck width of 15 nm.
Figure 4G:
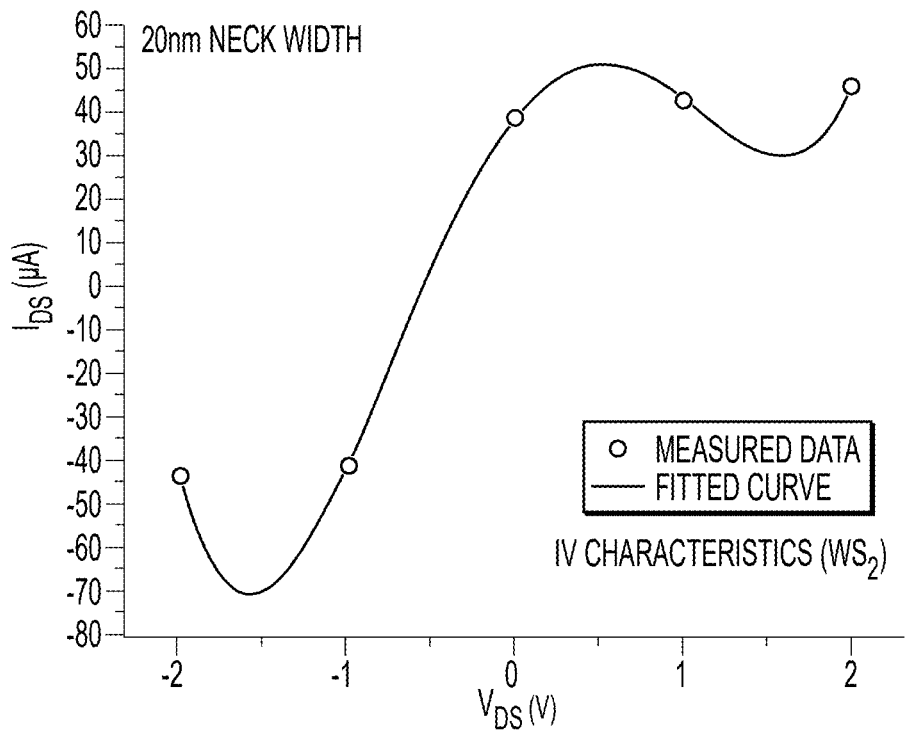
FIG. 4G is a chart showing current-voltage characteristics for a tungsten disulfide diode with a neck width of 20 nm.
Figure 4H:
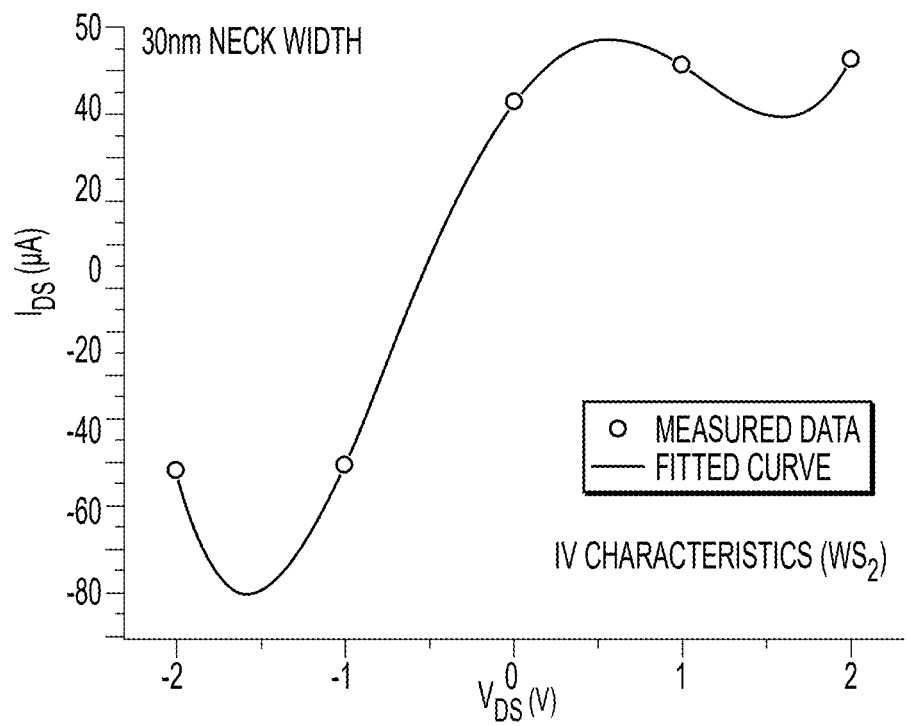
FIG. 4H is a chart showing current-voltage characteristics for a tungsten disulfide diode with a neck width of 30 nm.
Figure 4I:
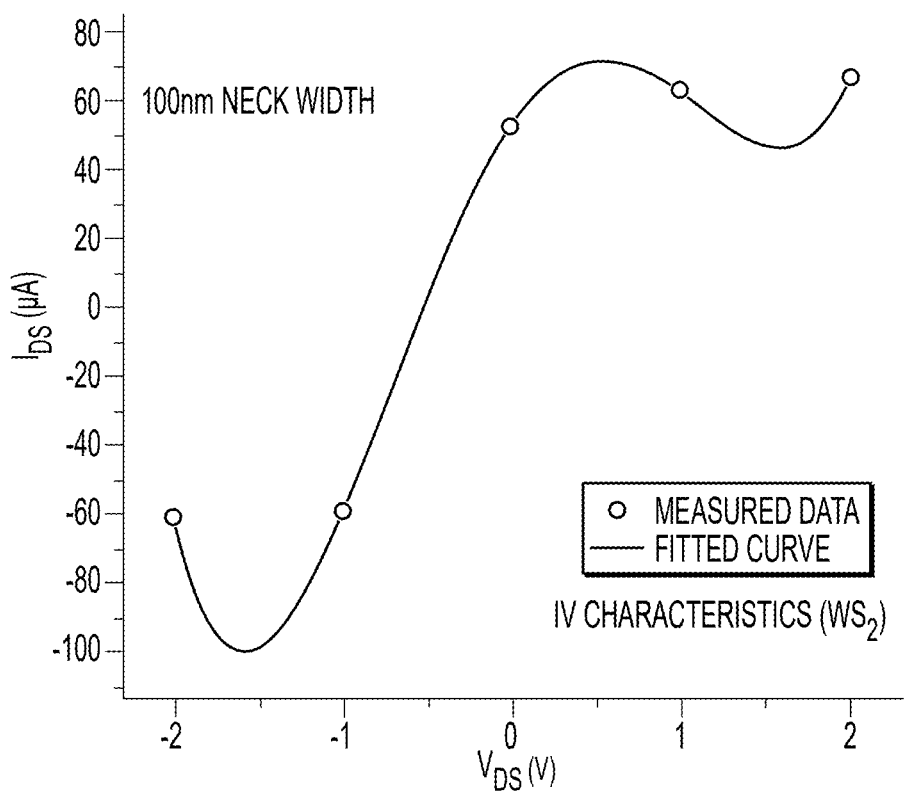
FIG. 4I is a chart showing current-voltage characteristics for a tungsten disulfide diode with a neck width of 100 nm.
Figure 5A:
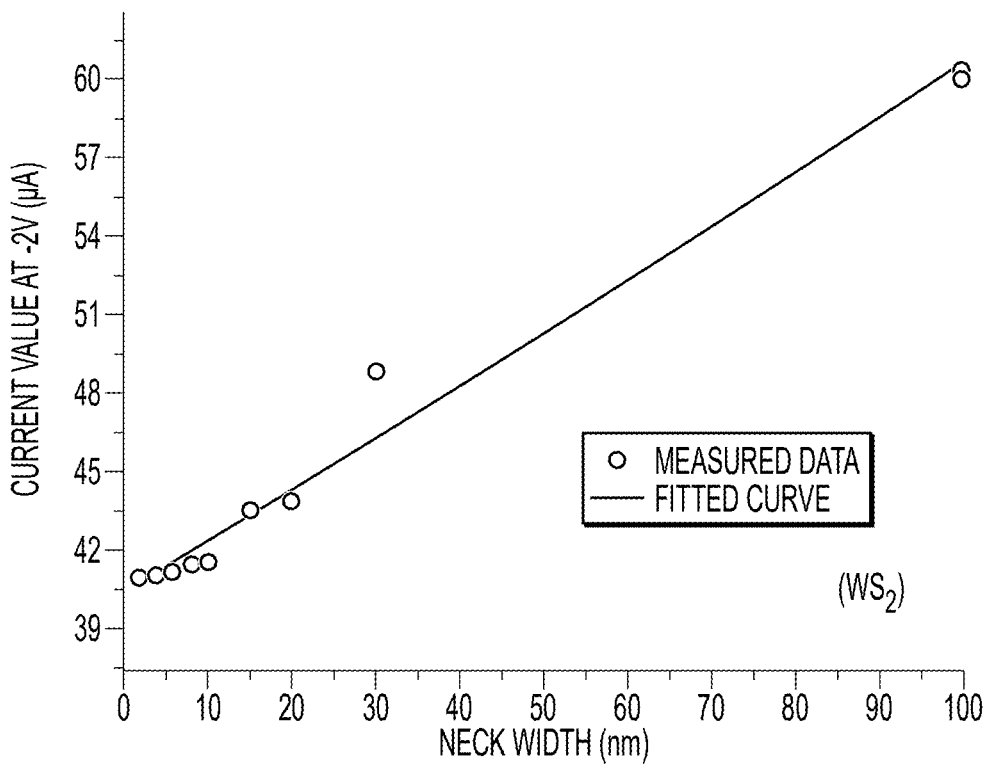
FIG. 5A is a chart showing current vs. neck width for a tungsten disulfide diode.
Figure 5B:
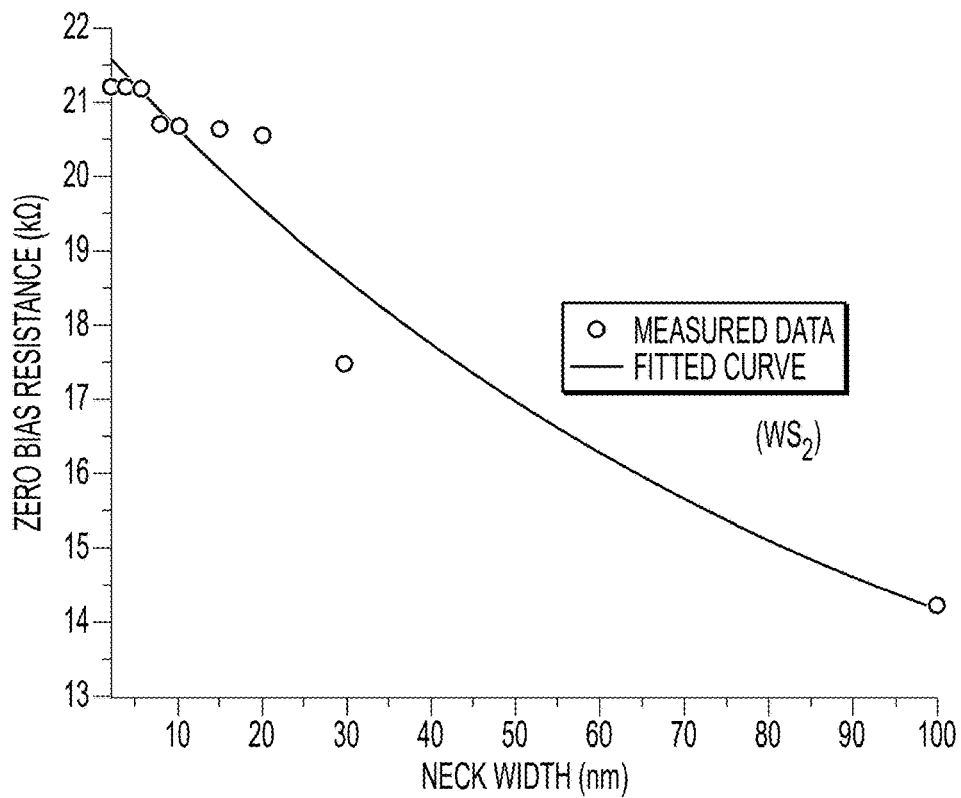
FIG. 5B is a chart showing zero-bias resistance vs. neck width for a tungsten disulfide diode.
Figure 5C:
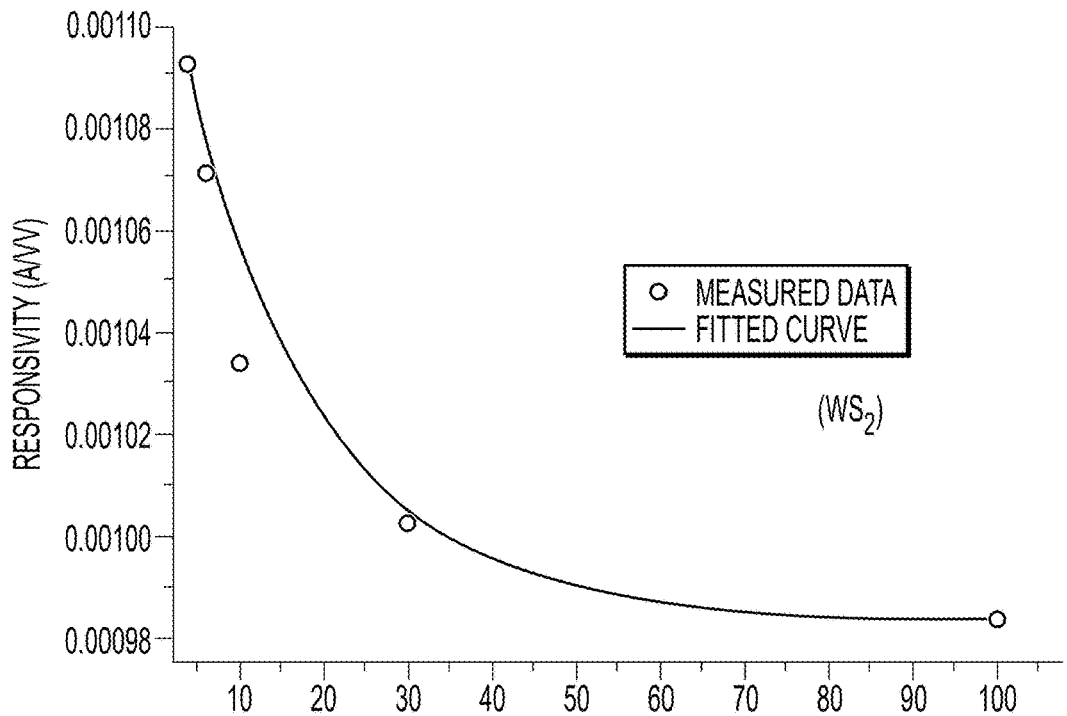
FIG. 5C is a chart showing responsivity vs. neck width for a tungsten disulfide diode.

With reference to FIGS. 4A-I, current-voltage (IV) characteristics for Tungsten Disulfide ($WS_2$) diodes are shown, with neck widths of 2 nm (FIG. 4A), 4 nm (FIG. 4B), 6 nm (FIG. 4C), 8 nm (FIG. 4D), 10 nm (FIG. 4E), 15 nm (FIG. 4F), 20 nm (FIG. 4G), 30 nm (FIG. 4H), and 100 nm (FIG. 4I). Tungsten Disulfide ($WS_2$) was chosen to study for its electron mobility and balanced transport characteristics, making it suitable for consistent performance across varying neck widths. With reference to FIGS. 5A-C, exponential fitted curves are shown for the simulation of a geometric diode of Tungsten Disulfide showing current vs. neck width (FIG. 5A), zero-bias resistance vs. neck width (FIG. 5B) and responsivity vs. neck width (FIG. 5C). The results of the analysis indicate that Tungsten Disulfide ($WS_2$), with a mean free path of approximately 30 nm, provides a balance between high rectification efficiency and low zero-bias resistance.

Figure 6A:
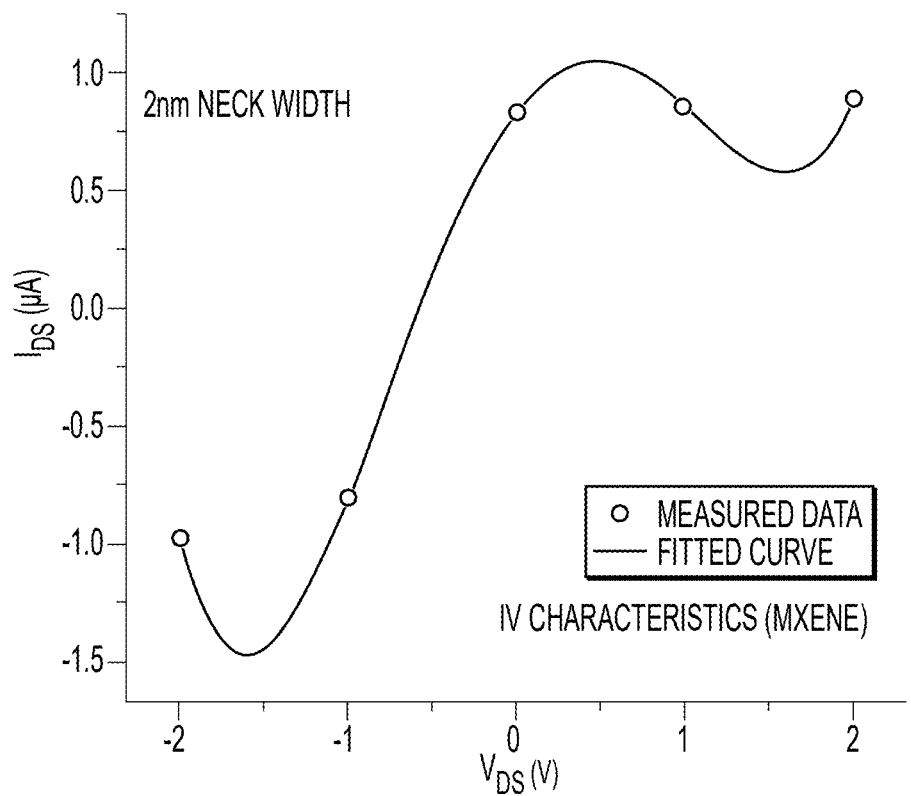
FIG. 6A is a chart showing current-voltage characteristics for a MXene diode with a neck width of 2 nm.
Figure 6B:
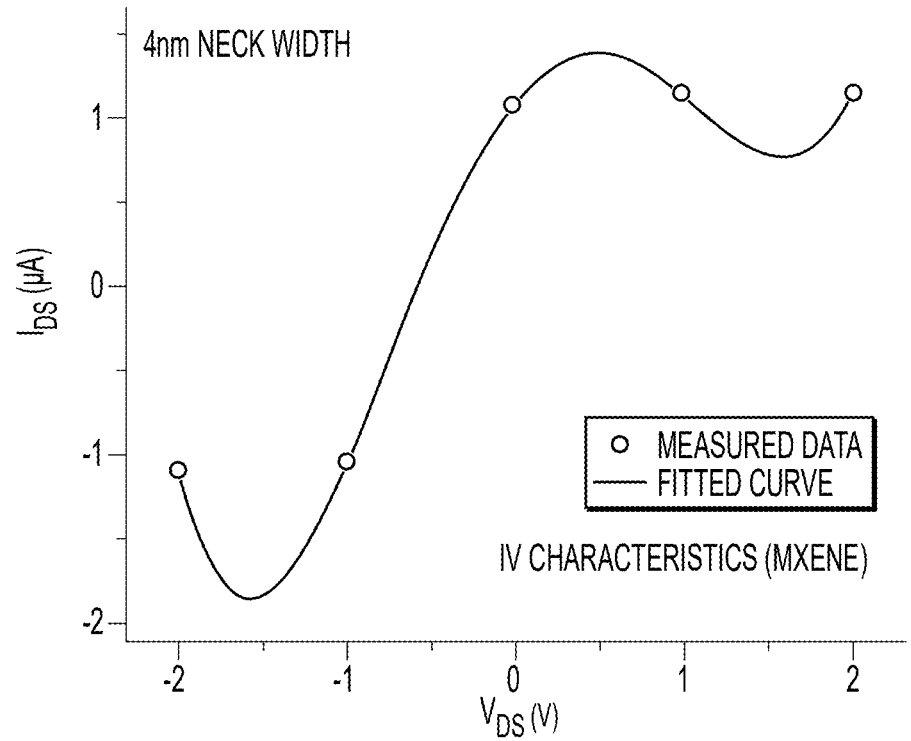
FIG. 6B is a chart showing current-voltage characteristics for a MXene diode with a neck width of 4 nm.
Figure 6C:
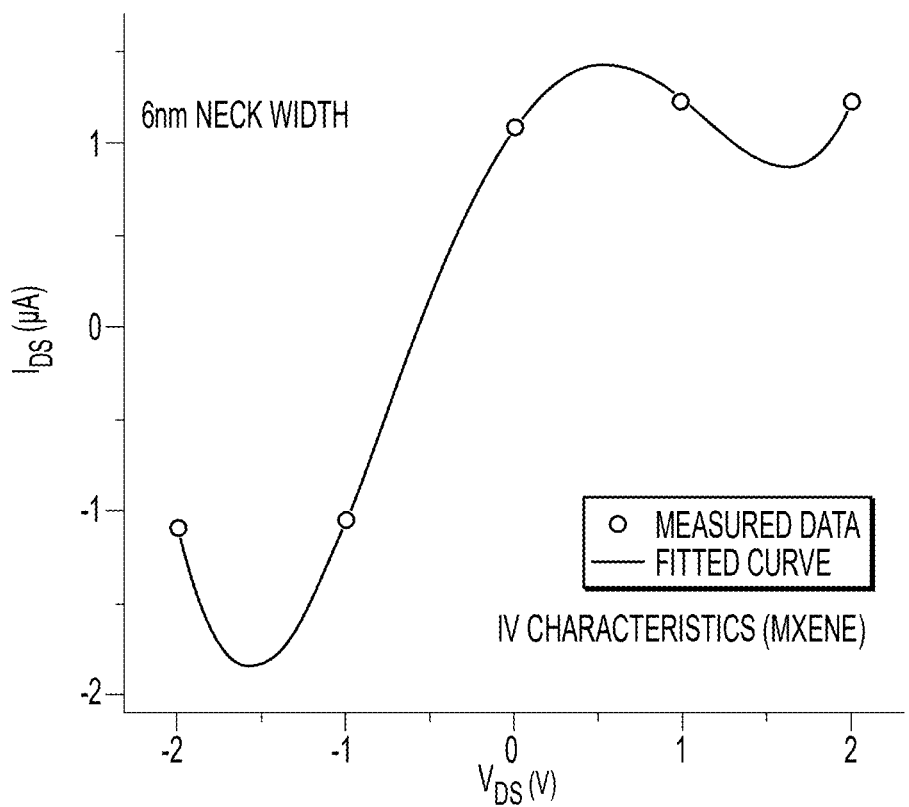
FIG. 6C is a chart showing current-voltage characteristics for a MXene diode with a neck width of 6 nm.
Figure 6D:
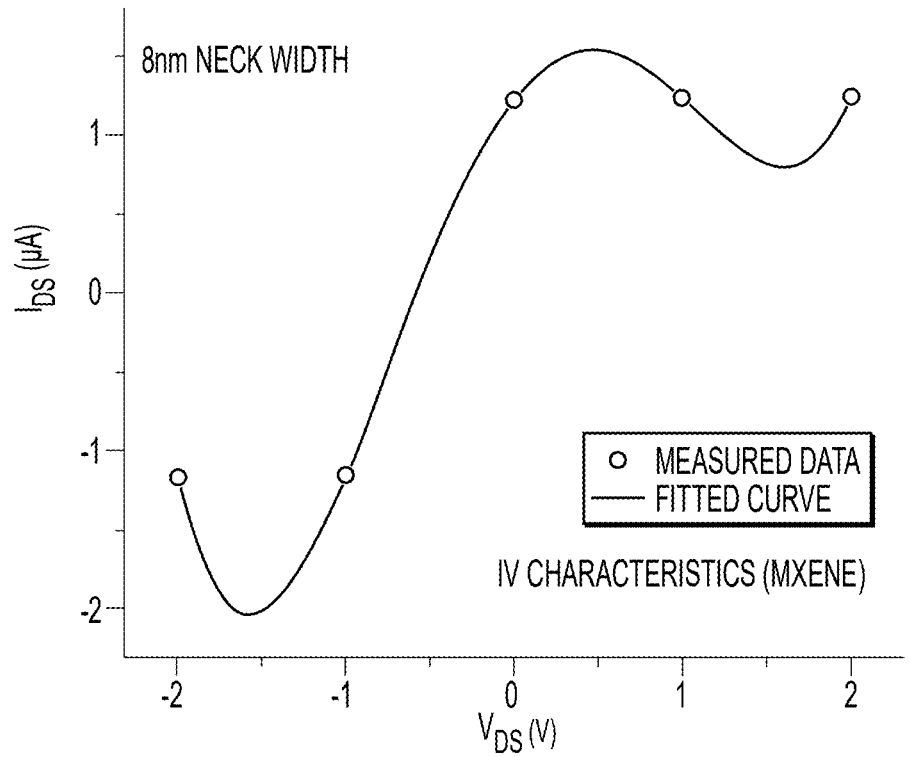
FIG. 6D is a chart showing current-voltage characteristics for a MXene diode with a neck width of 8 nm.
Figure 6E:
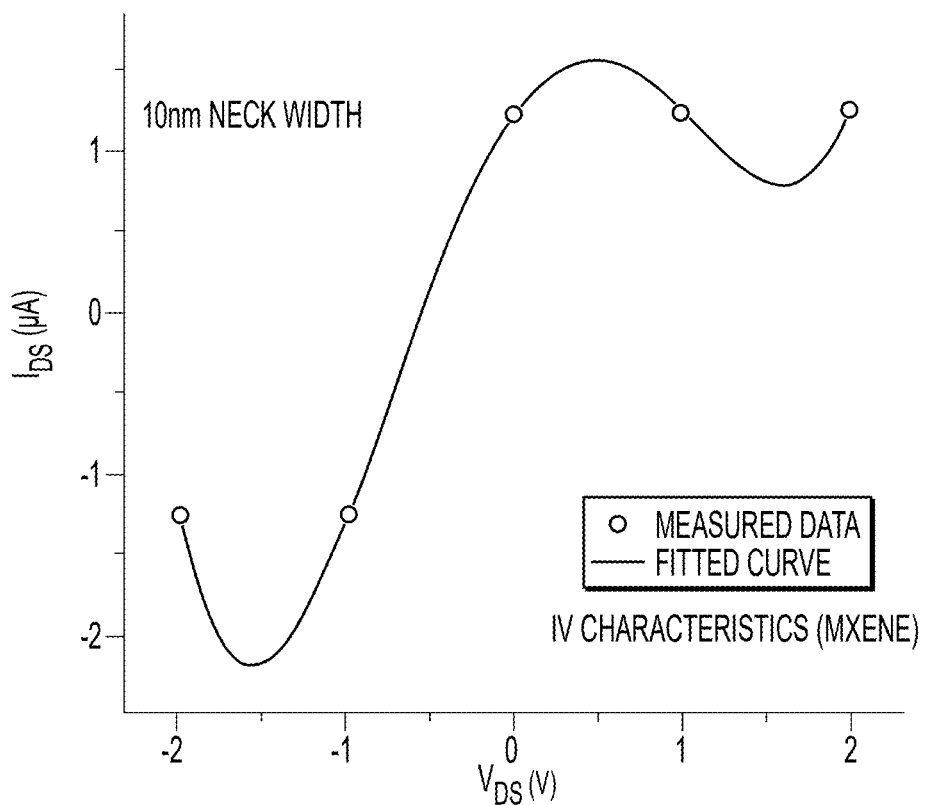
FIG. 6E is a chart showing current-voltage characteristics for a MXene diode with a neck width of 10 nm.
Figure 6F:
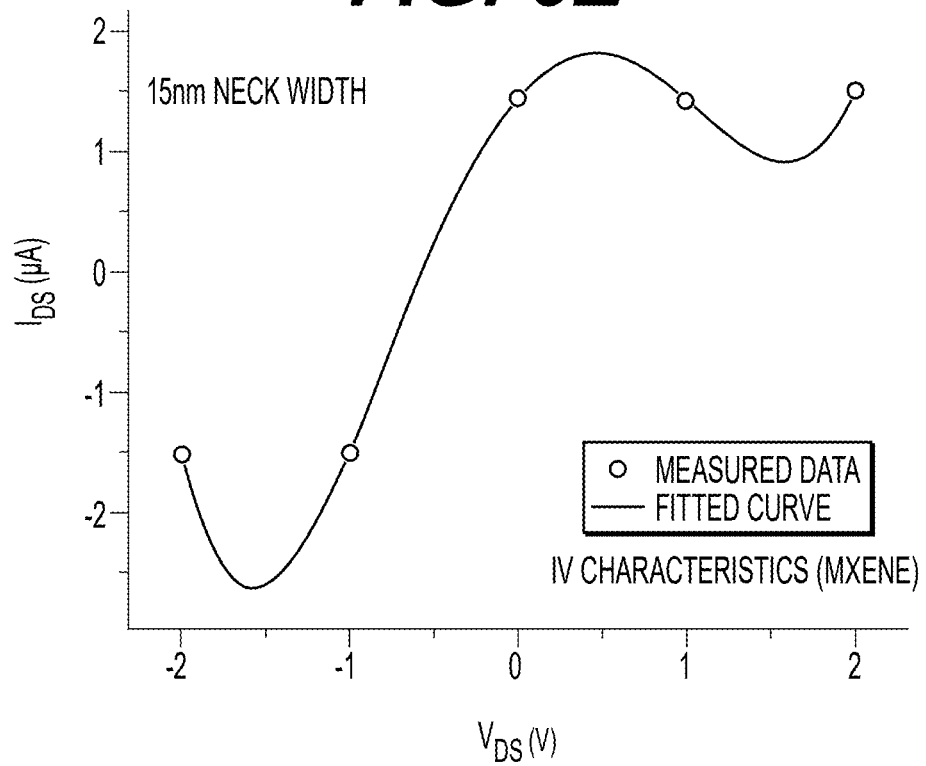
FIG. 6F is a chart showing current-voltage characteristics for a MXene diode with a neck width of 15 nm.
Figure 6G:
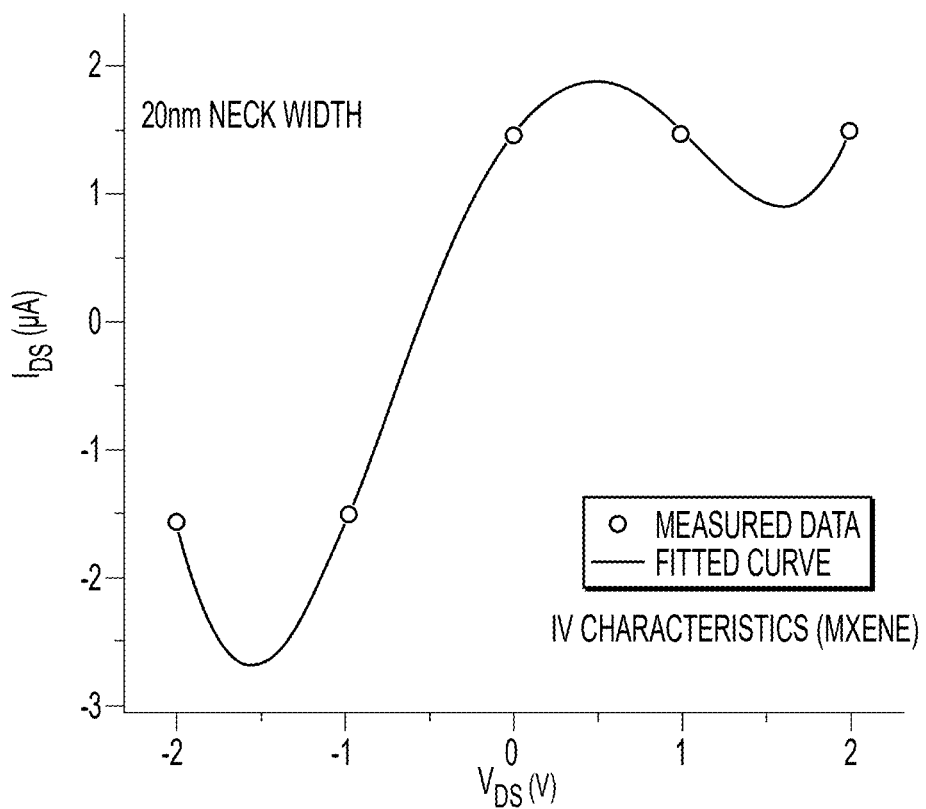
FIG. 6G is a chart showing current-voltage characteristics for a MXene diode with a neck width of 20 nm.
Figure 6H:
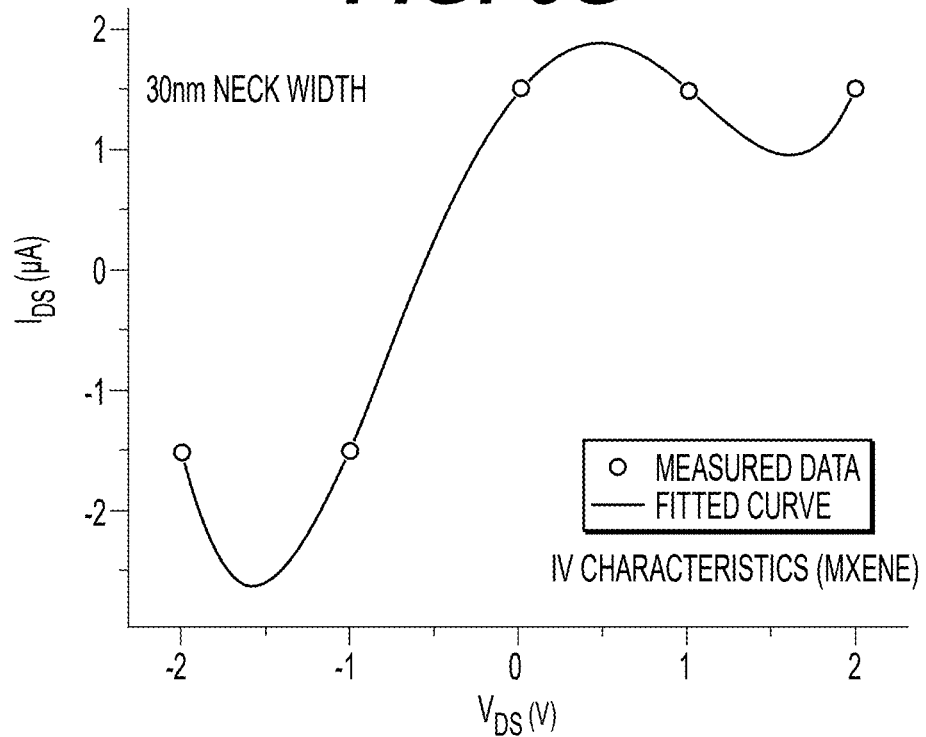
FIG. 6H is a chart showing current-voltage characteristics for a MXene diode with a neck width of 30 nm.
Figure 6I:
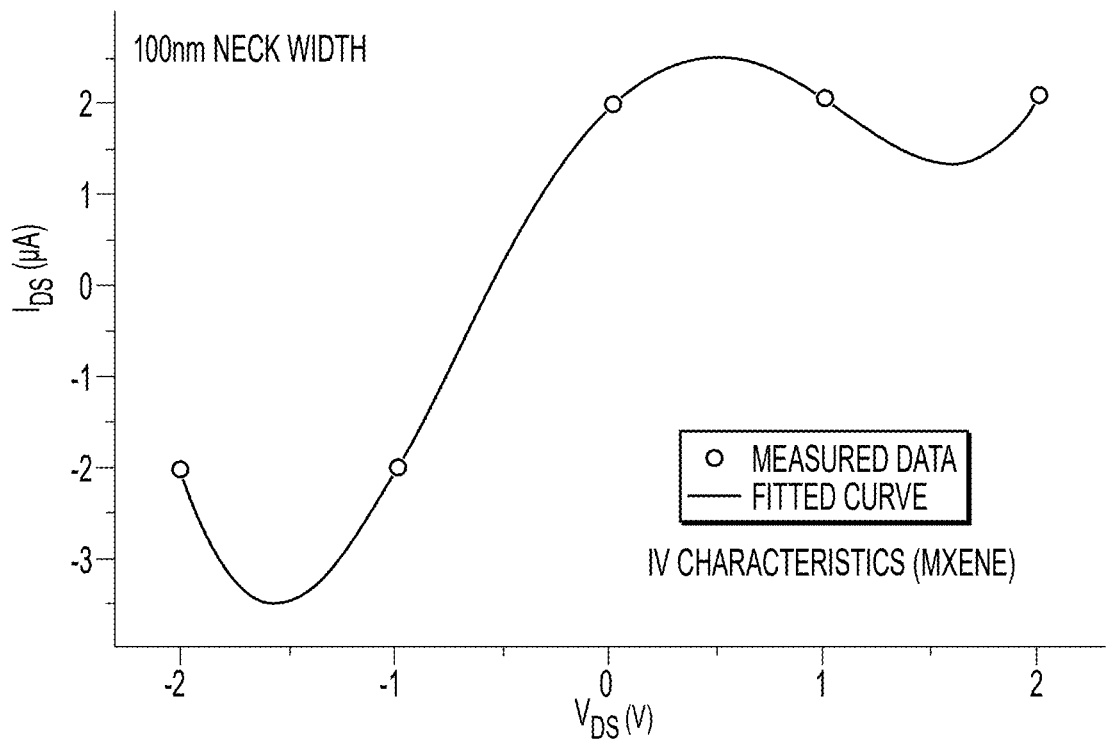
FIG. 6I is a chart showing current-voltage characteristics for a MXene diode with a neck width of 100 nm.
Figure 7A:
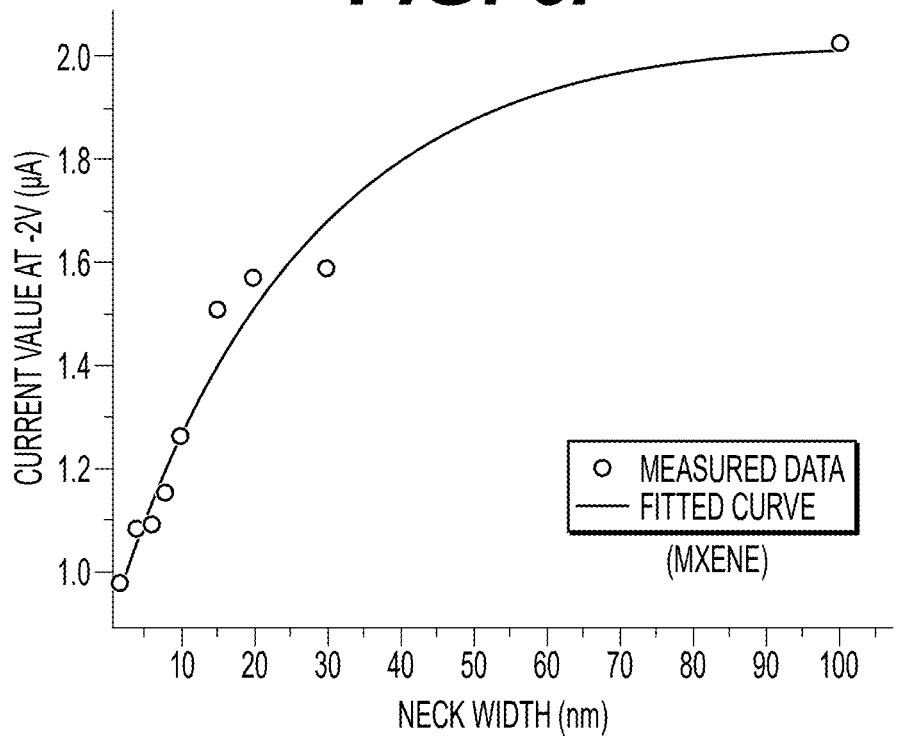
FIG. 7A is a chart showing current vs. neck width for a MXene diode.
Figure 7B:
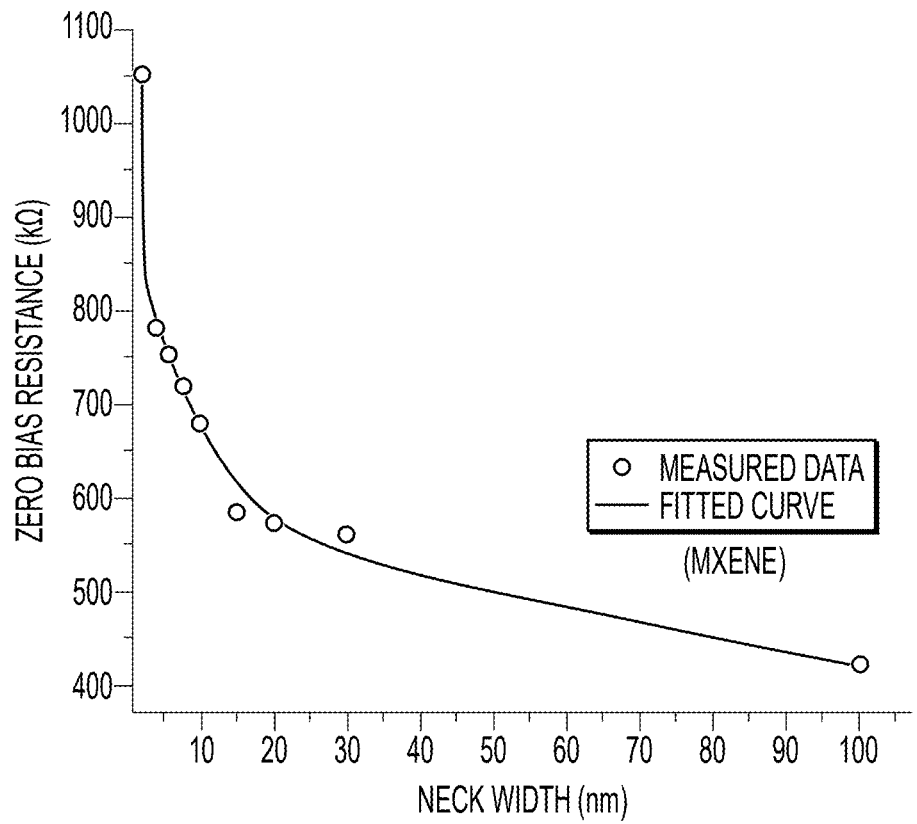
FIG. 7B is a chart showing zero-bias resistance vs. neck width for a MXene diode.
Figure 7C:
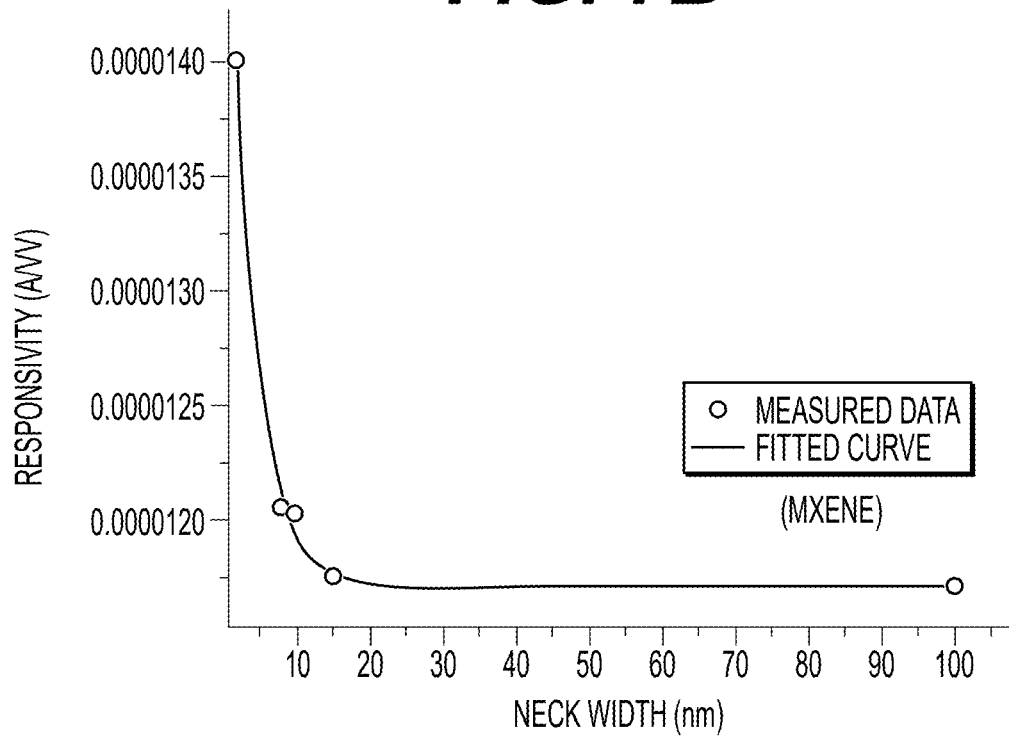
FIG. 7C is a chart showing responsivity vs. neck width for a MXene diode.

With reference to FIGS. 6A-I, current-voltage (IV) characteristics for MXene diodes are shown, with neck widths of 2 nm (FIG. 6A), 4 nm (FIG. 6B), 6 nm (FIG. 6C), 8 nm (FIG. 6D), 10 nm (FIG. 6E), 15 nm (FIG. 6F), 20 nm (FIG. 6G), 30 nm (FIG. 6H), and 100 nm (FIG. 6I). MXene, known for its exceptionally high electrical conductivity, appears to enable strong carrier injection but is limited by its relatively short mean free path. With reference to FIGS. 7A-C, exponential fitted curves are shown for the simulation of a geometric diode of MXene showing current vs. neck width (FIG. 7A), zero-bias resistance vs. neck width (FIG. 7B) and responsivity vs. neck width (FIG. 7C). The results of the analysis indicate that MXene, with a mean free path of approximately 10 nm, offers high electrical conductivity but faces limitations due to increased scattering, leading to higher zero-bias resistance.

Figure 8A:
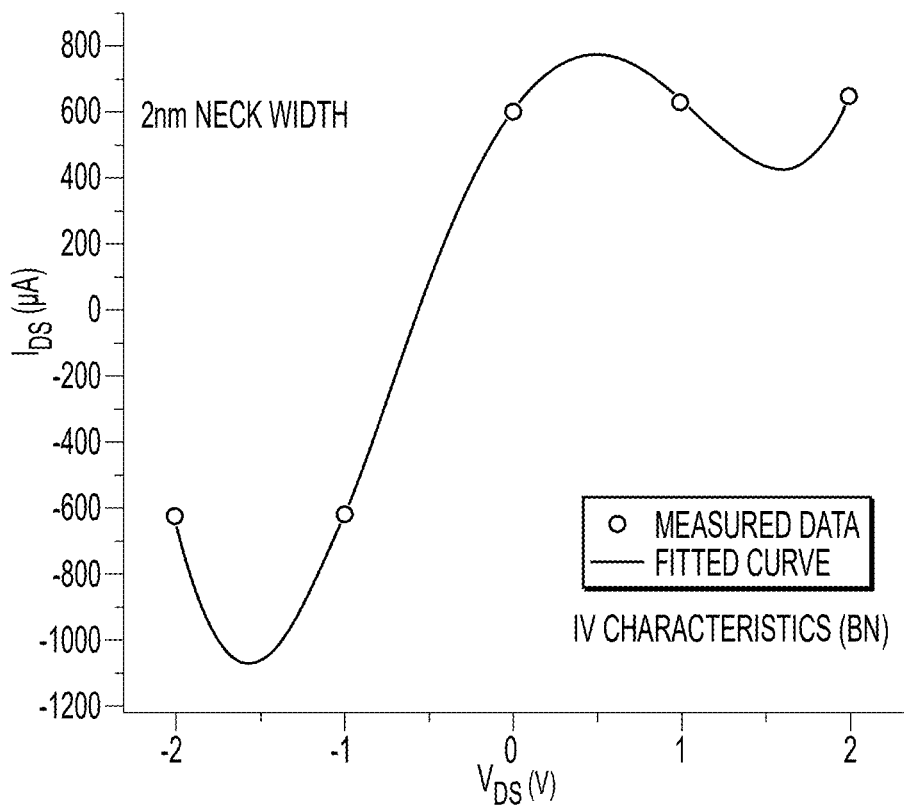
FIG. 8A is a chart showing current-voltage characteristics for a boron nitride diode with a neck width of 2 nm.
Figure 8B:
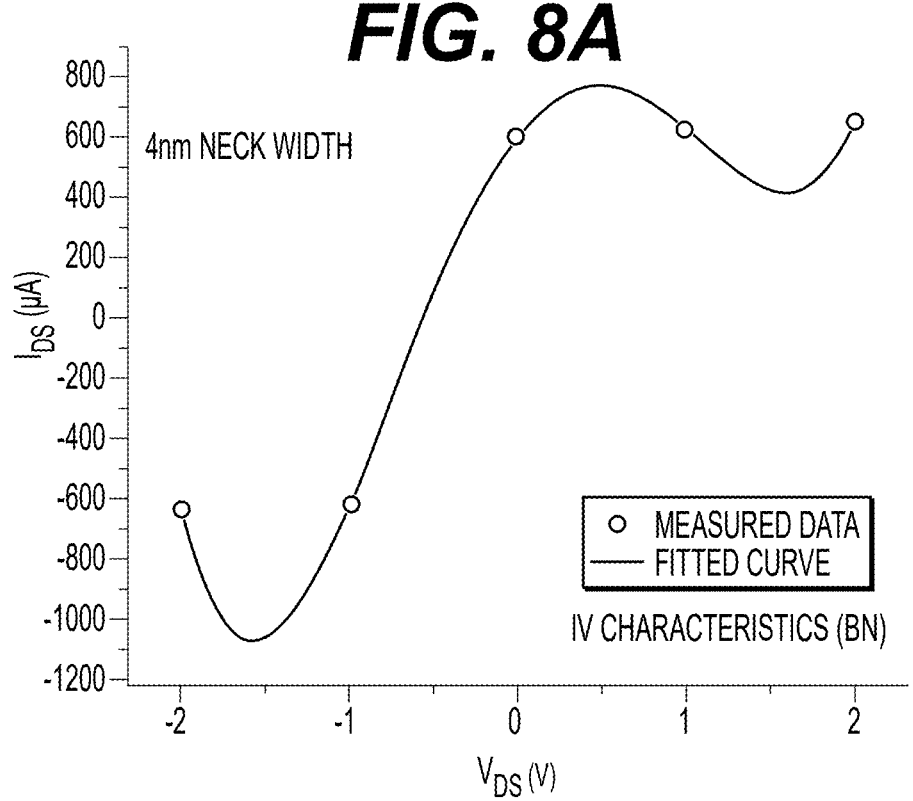
FIG. 8B is a chart showing current-voltage characteristics for a boron nitride diode with a neck width of 4 nm.
Figure 8C:
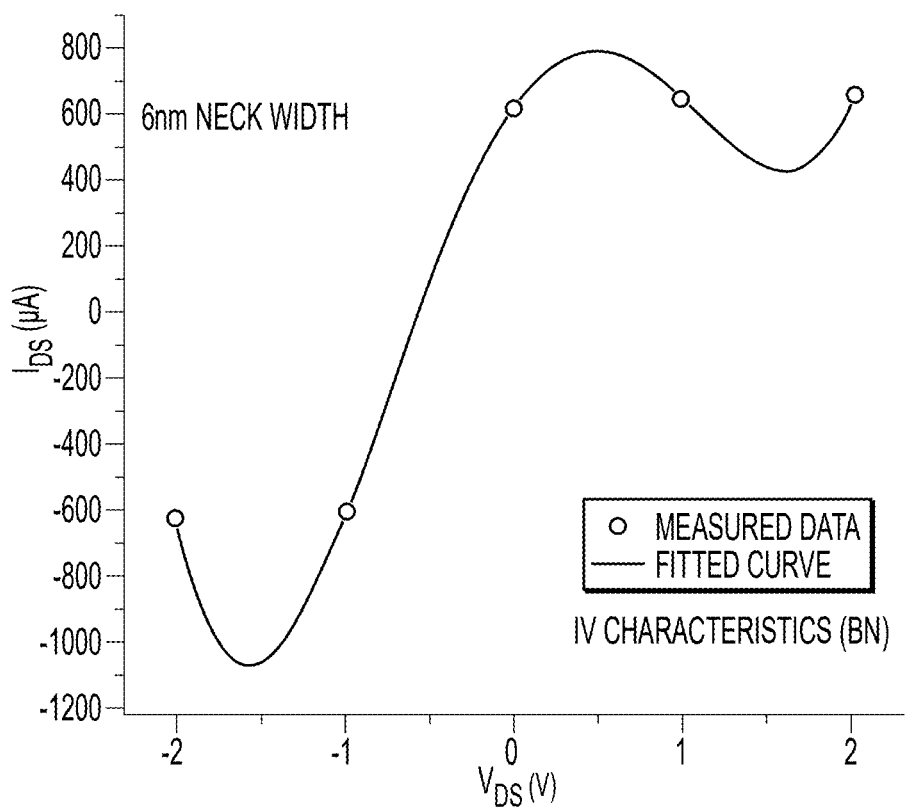
FIG. 8C is a chart showing current-voltage characteristics for a boron nitride diode with a neck width of 6 nm.
Figure 8D:
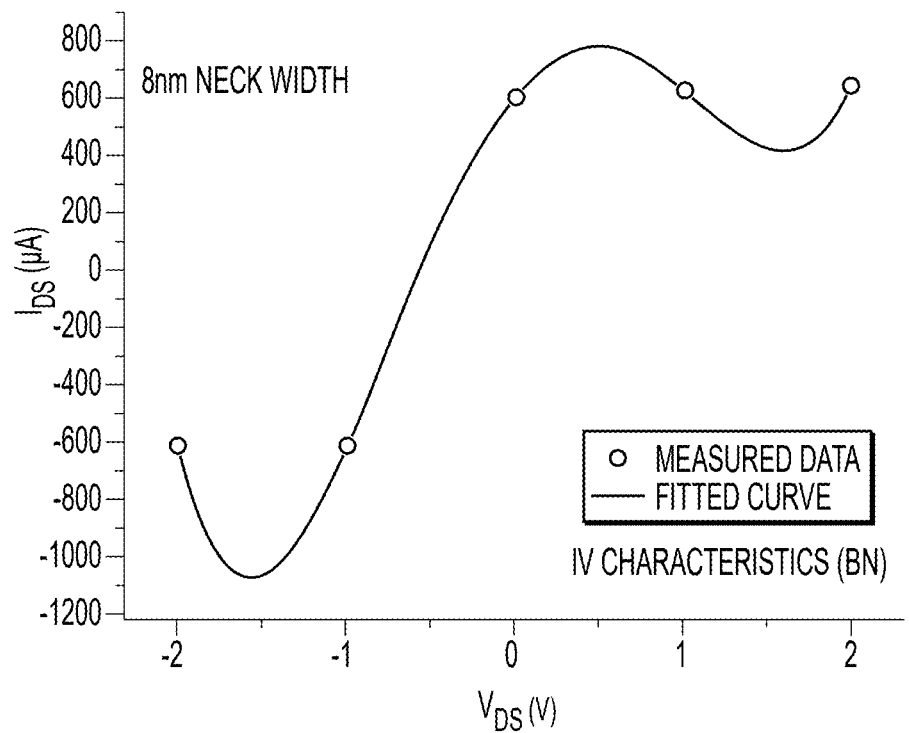
FIG. 8D is a chart showing current-voltage characteristics for a boron nitride diode with a neck width of 8 nm.
Figure 8E:
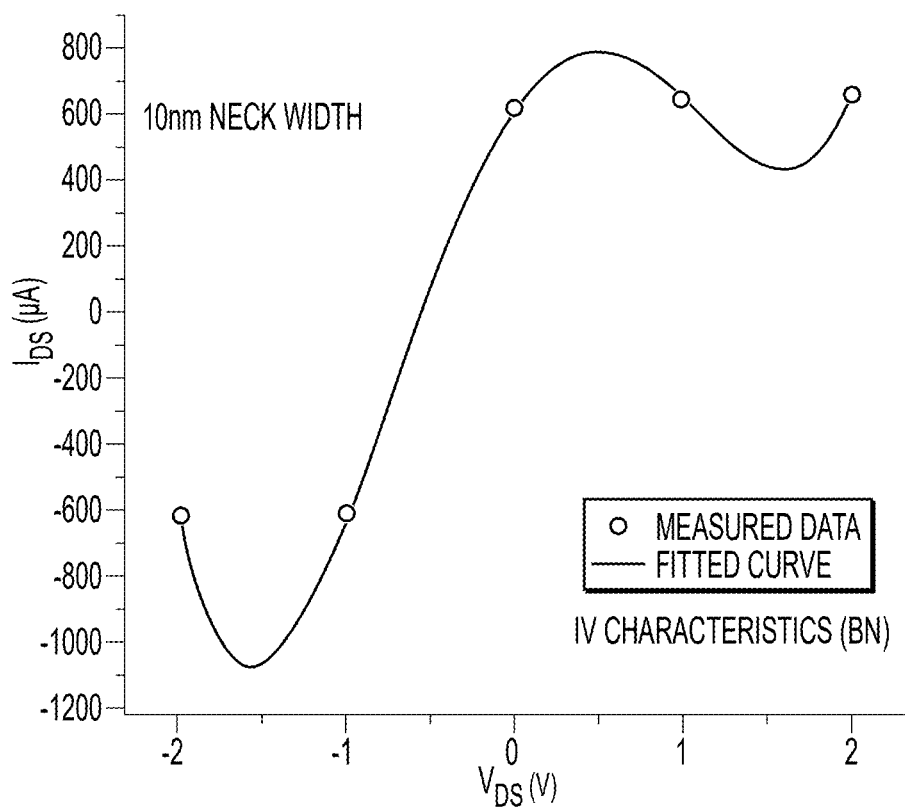
FIG. 8E is a chart showing current-voltage characteristics for a boron nitride diode with a neck width of 10 nm.
Figure 8F:
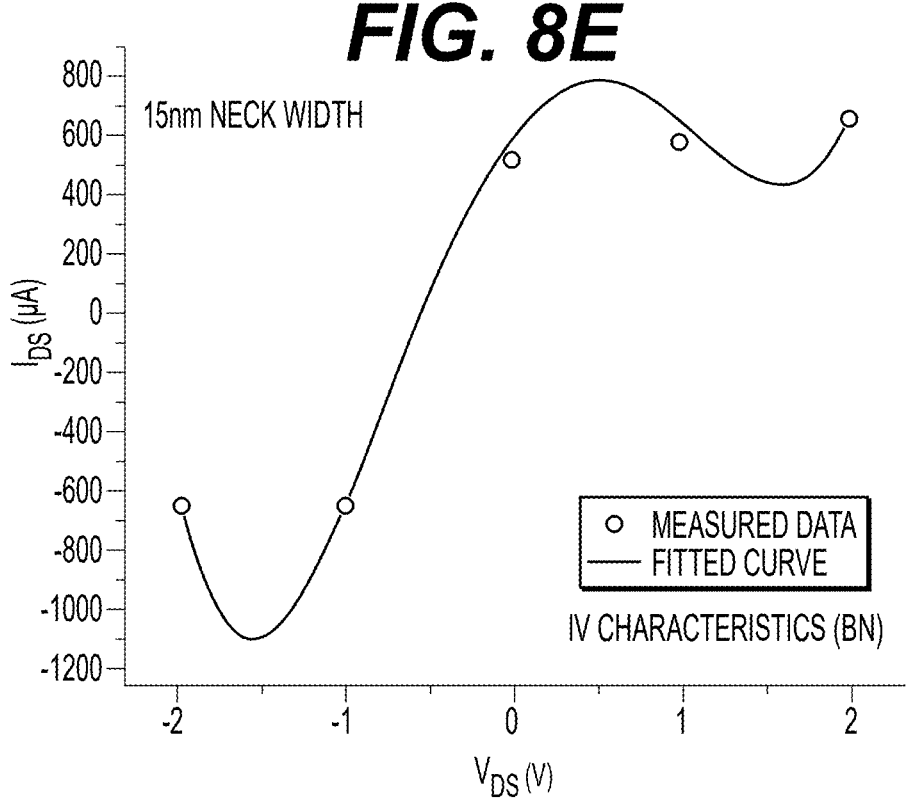
FIG. 8F is a chart showing current-voltage characteristics for a boron nitride diode with a neck width of 15 nm.
Figure 8G:
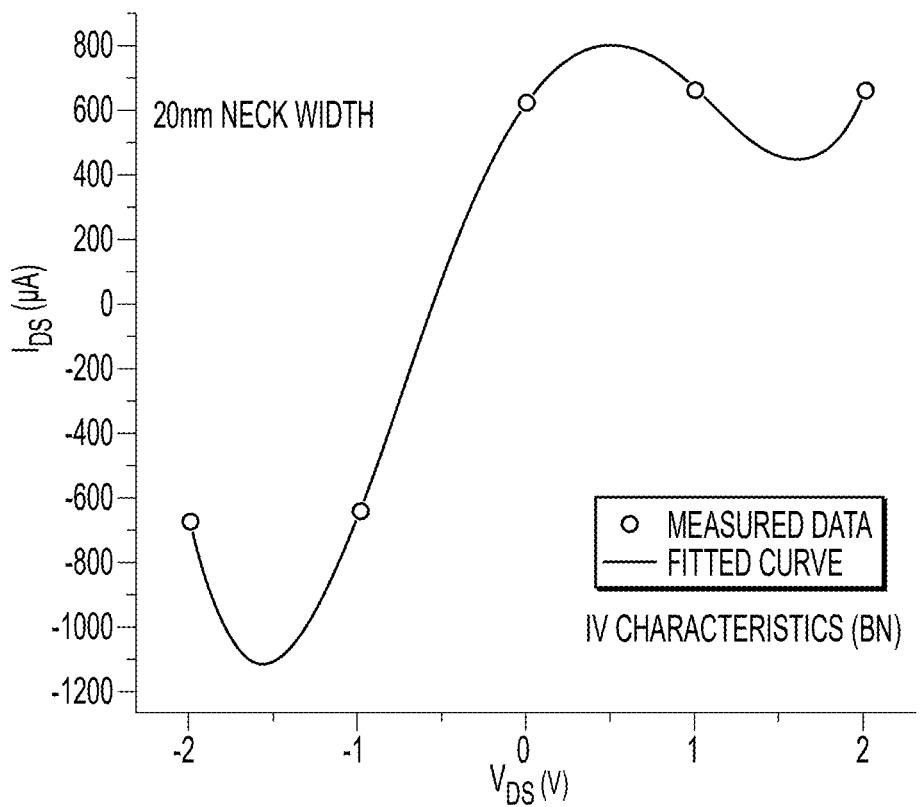
FIG. 8G is a chart showing current-voltage characteristics for a boron nitride diode with a neck width of 20 nm.
Figure 8H:
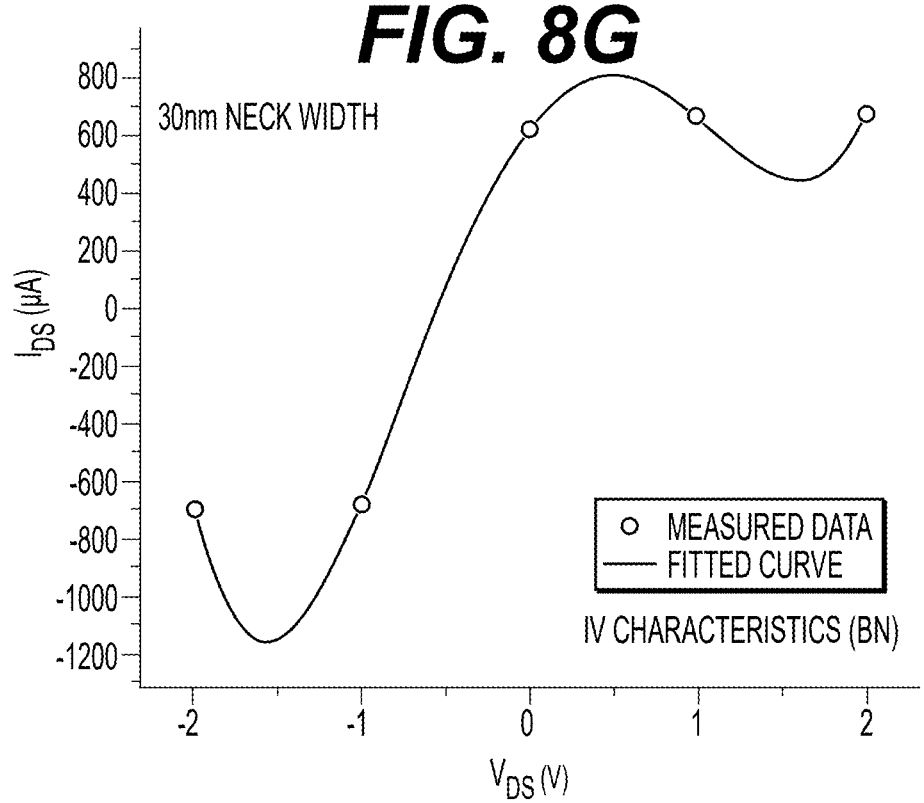
FIG. 8H is a chart showing current-voltage characteristics for a boron nitride diode with a neck width of 30 nm.
Figure 8I:
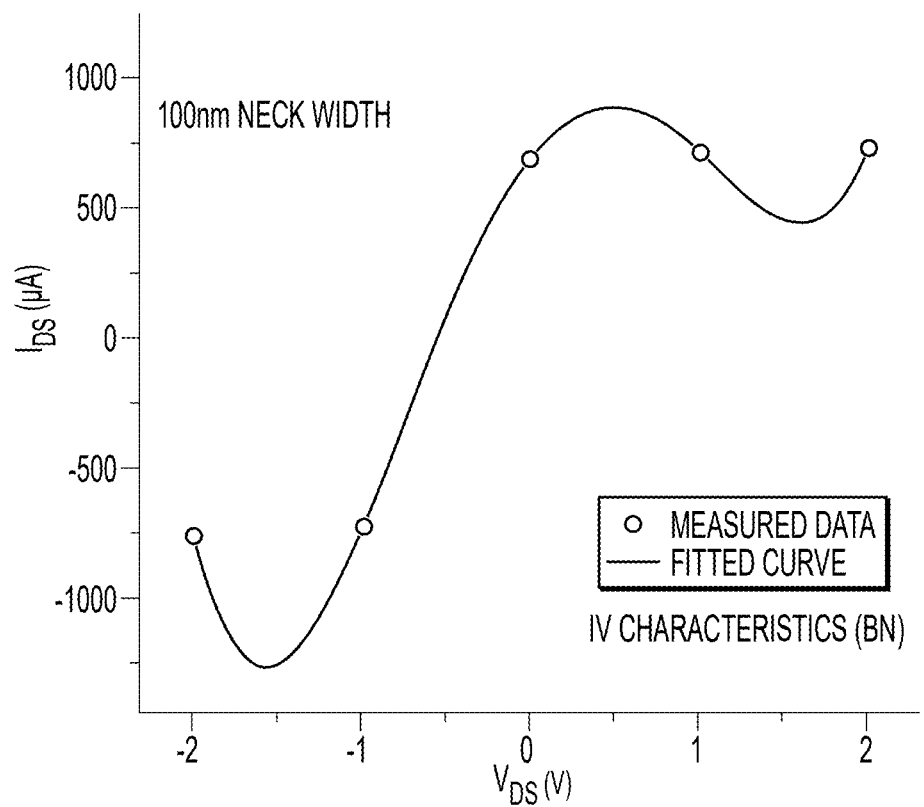
FIG. 8I is a chart showing current-voltage characteristics for a boron nitride diode with a neck width of 100 nm.
Figure 9A:
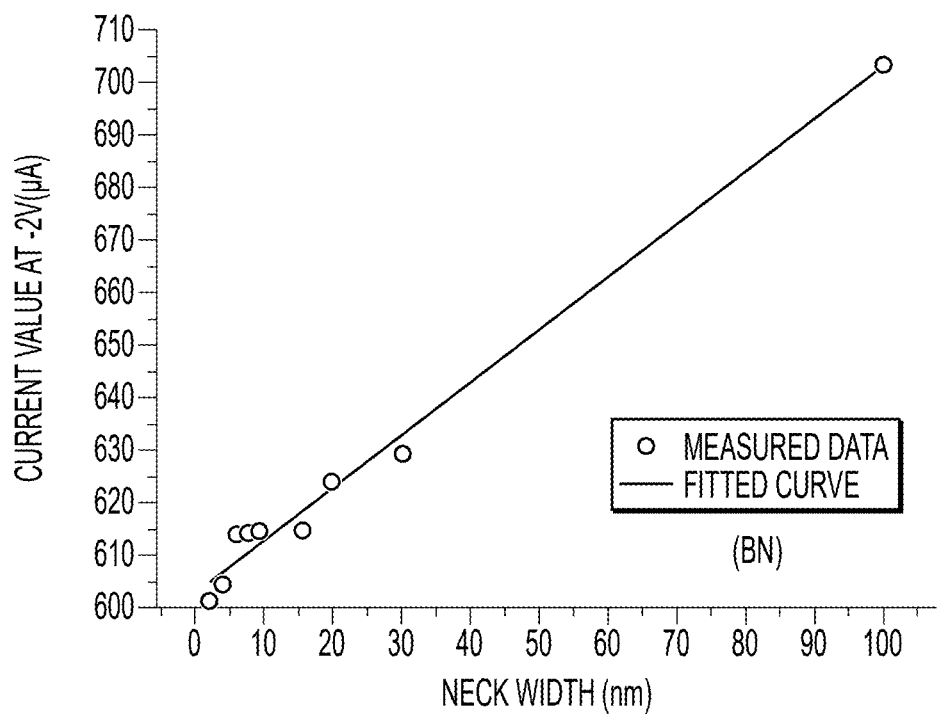
FIG. 9A is a chart showing current vs. neck width for a boron nitride diode.
Figure 9B:
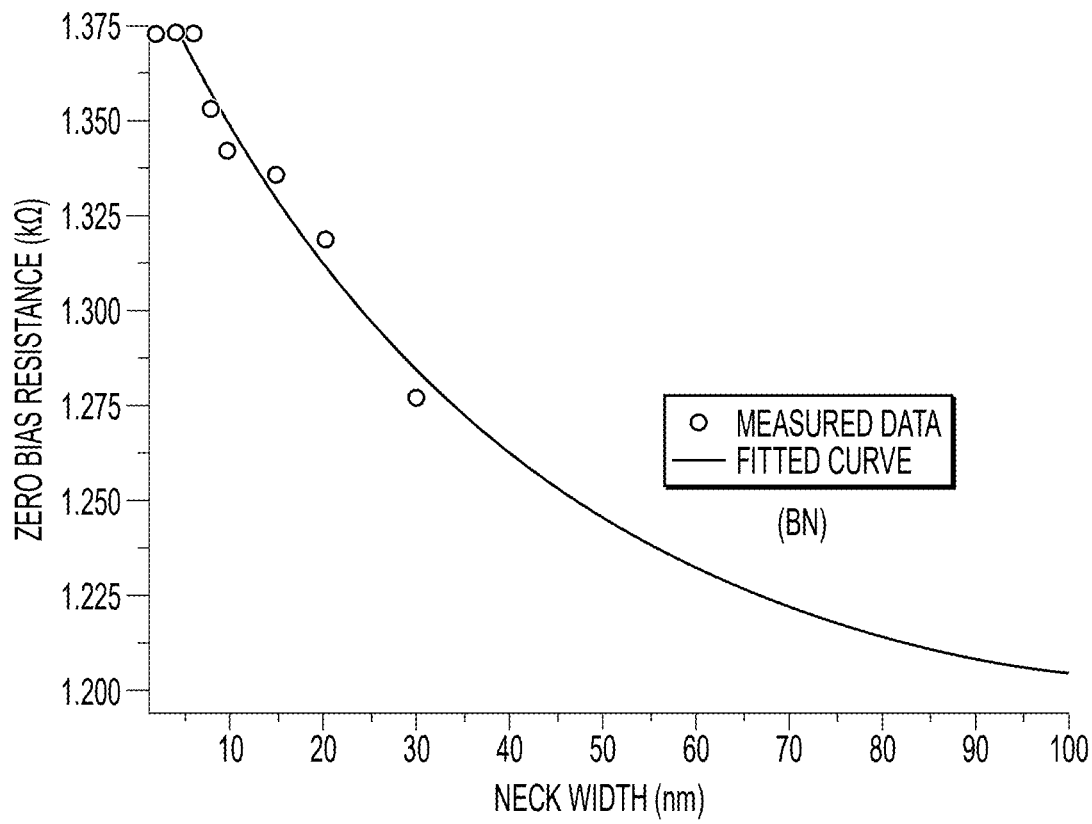
FIG. 9B is a chart showing zero-bias resistance vs. neck width for a boron nitride diode.
Figure 9C:
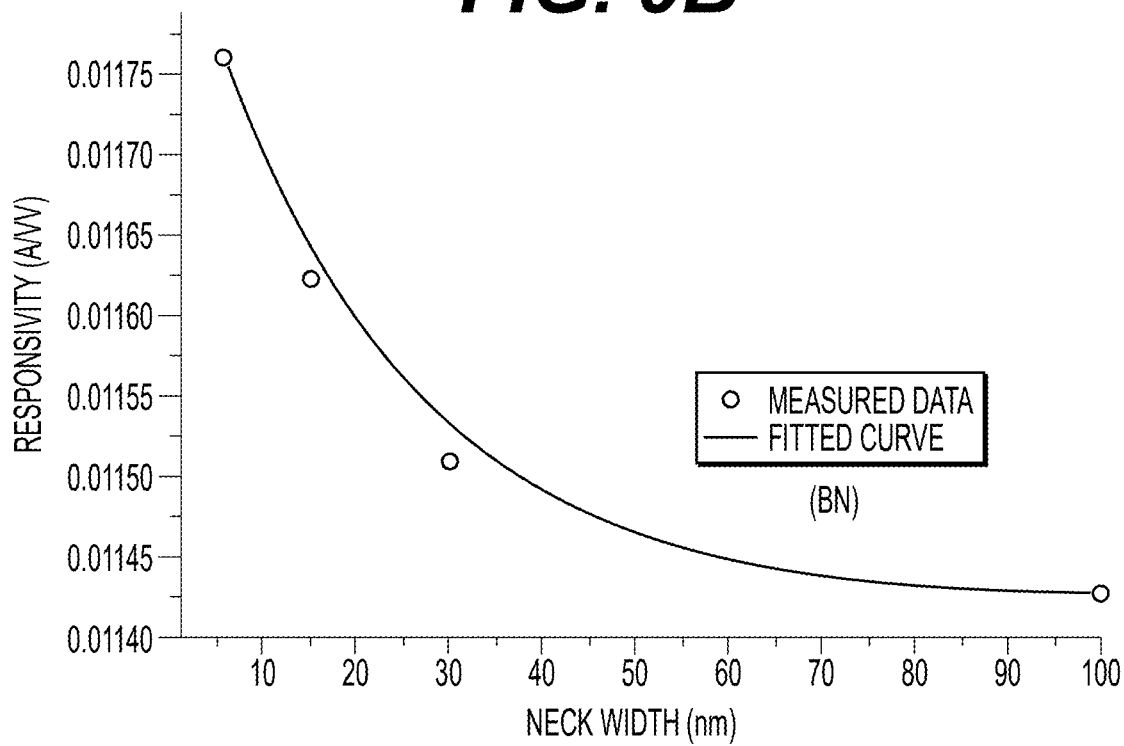
FIG. 9C is a chart showing responsivity vs. neck width for a boron nitride diode.

With reference to FIGS. 8A-I, current-voltage (IV) characteristics for Boron Nitride (BN) diodes are shown, with neck widths of 2 nm (FIG. 8A), 4 nm (FIG. 8B), 6 nm (FIG. 8C), 8 nm (FIG. 8D), 10 nm (FIG. 8E), 15 nm (FIG. 8F), 20 nm (FIG. 8G), 30 nm (FIG. 8H), and 100 nm (FIG. 8I). Boron Nitride was chosen for simulation due to its excellent thermal stability, as well as wide bandgap and long mean free path (100 nm), promoting near-ballistic transport. With reference to FIGS. 9A-C, exponential fitted curves are shown for the simulation of a geometric diode of Boron Nitride showing current vs. neck width (FIG. 9A), zero-bias resistance vs. neck width (FIG. 9B) and responsivity vs. neck width (FIG. 9C). The results of the analysis indicate that Boron Nitride, with a mean free path of approximately 100 nm, demonstrates low zero-bias resistance, making it well-suited for THz rectification applications.

Figure 10A:
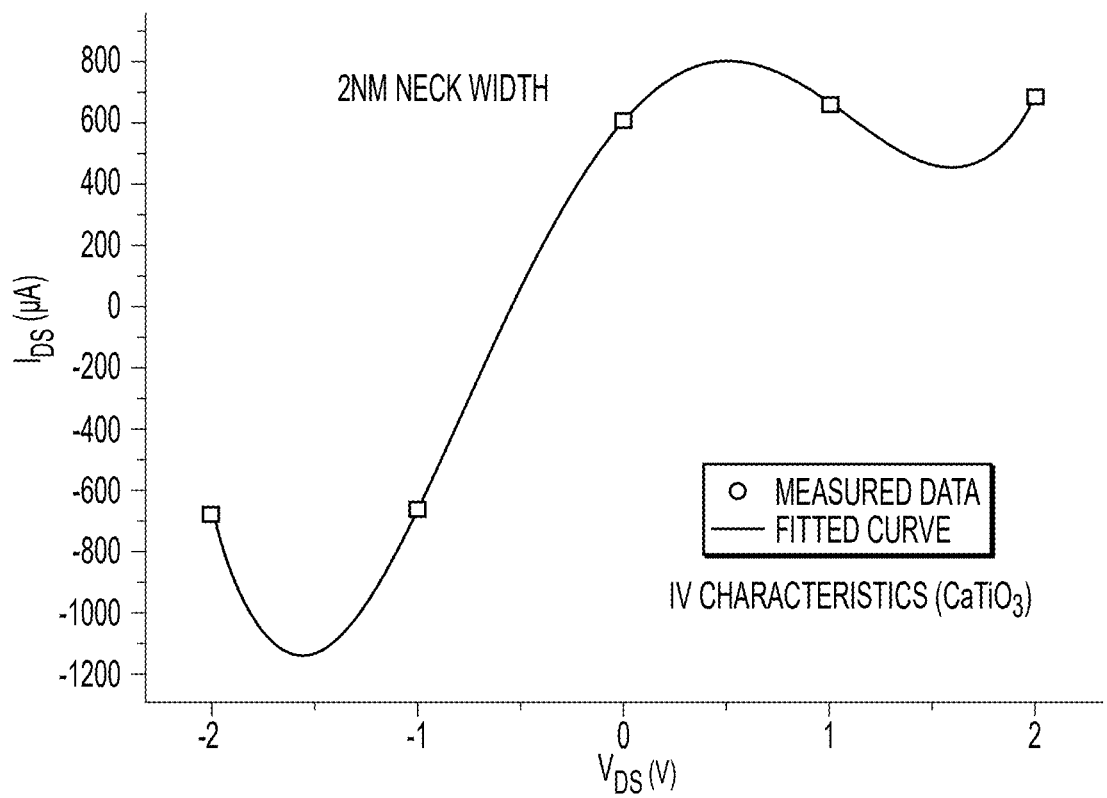
FIG. 10A is a chart showing current-voltage characteristics for a calcium titanate diode with a neck width of 2 nm.
Figure 10B:
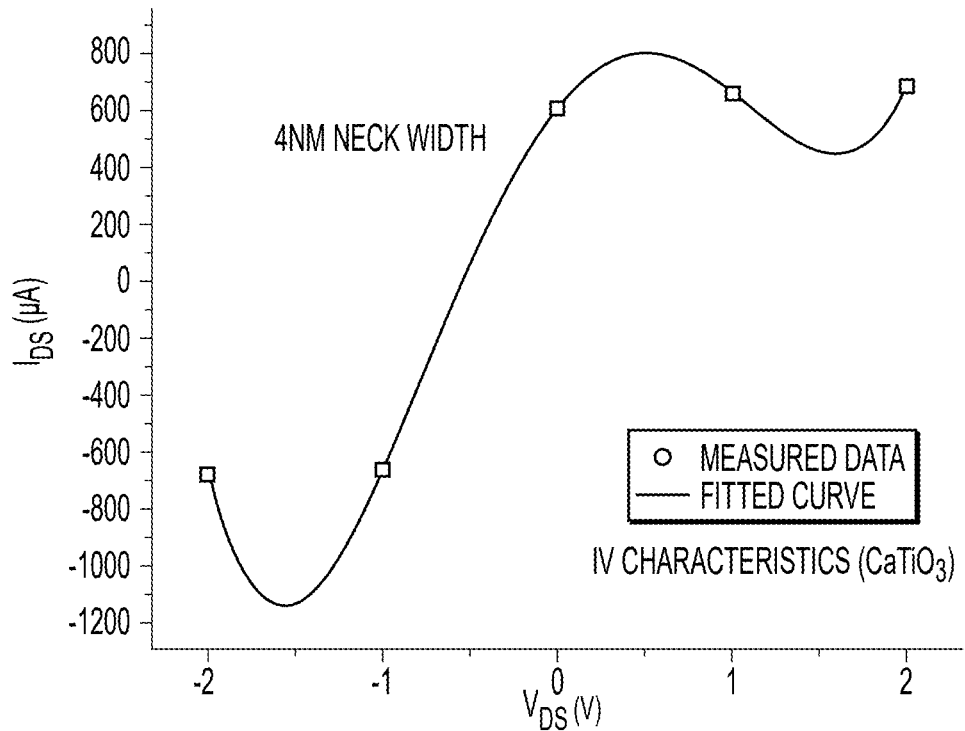
FIG. 10B is a chart showing current-voltage characteristics for a calcium titanate diode with a neck width of 4 nm.
Figure 10C:
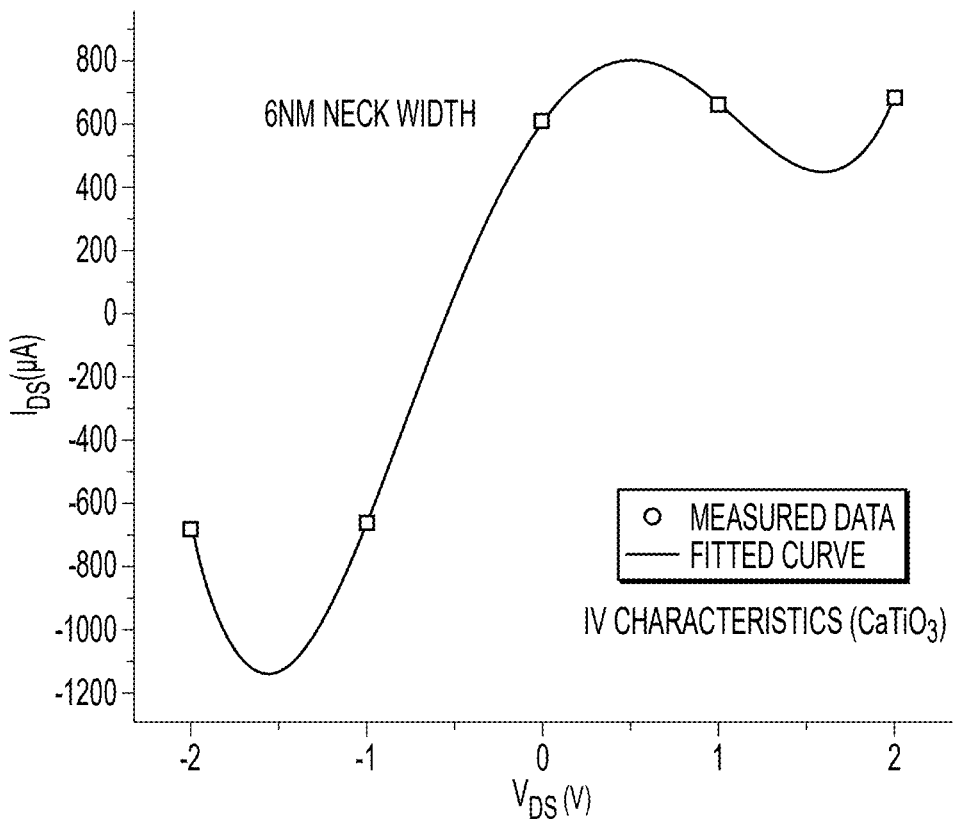
FIG. 10C is a chart showing current-voltage characteristics for a calcium titanate diode with a neck width of 6 nm.
Figure 10D:
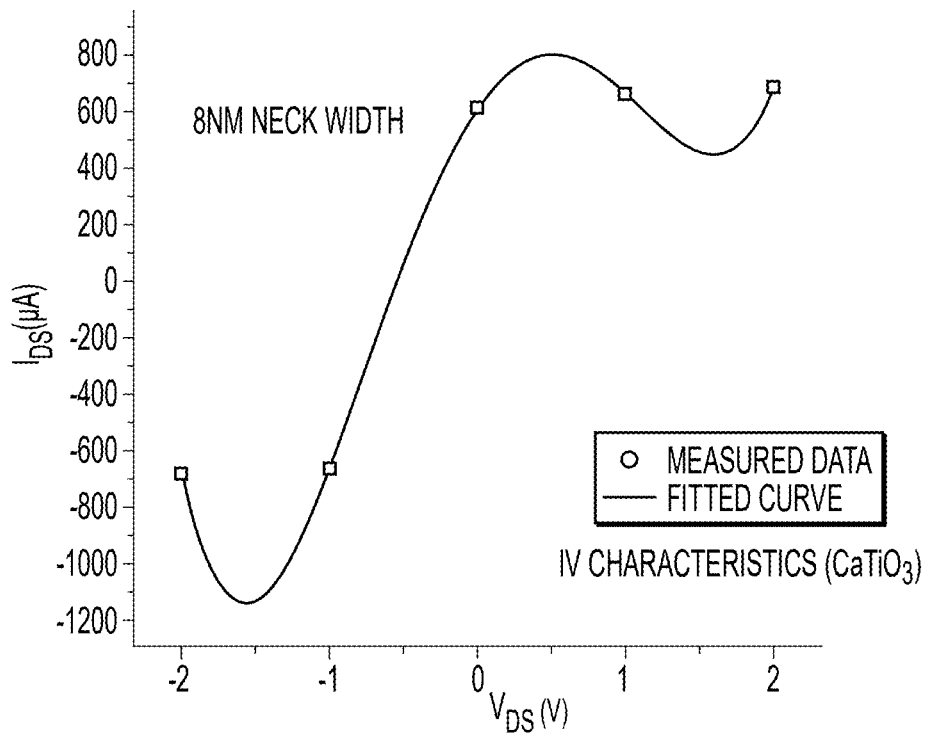
FIG. 10D is a chart showing current-voltage characteristics for a calcium titanate diode with a neck width of 8 nm.
Figure 10E:
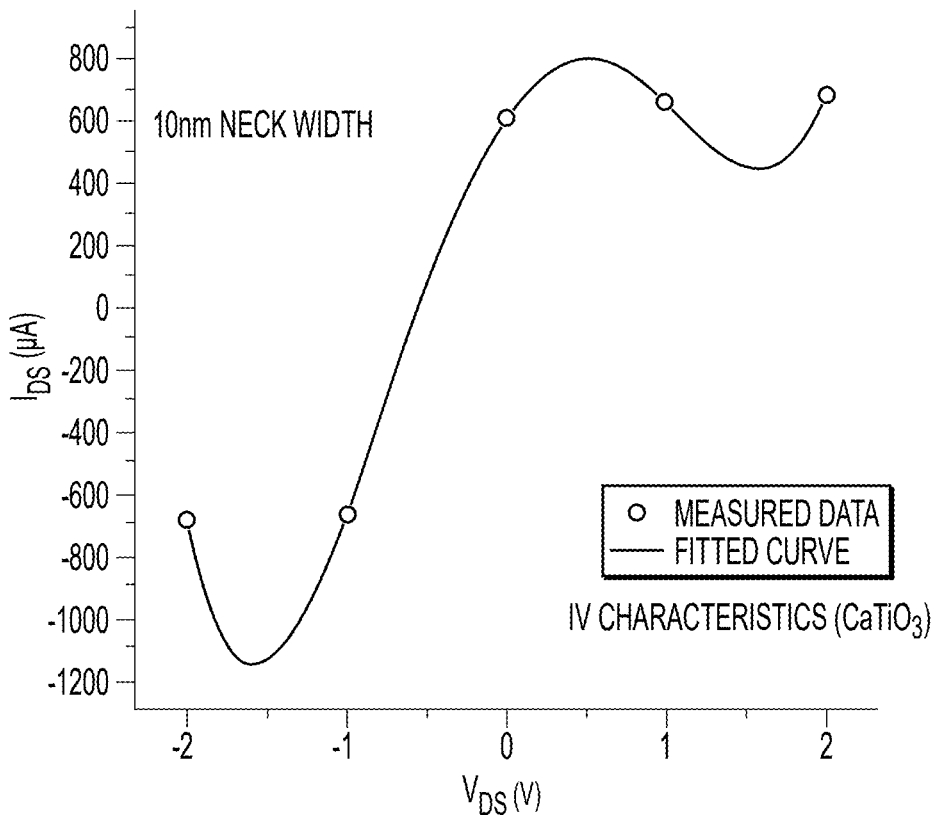
FIG. 10E is a chart showing current-voltage characteristics for a calcium titanate diode with a neck width of 10 nm.
Figure 10F:
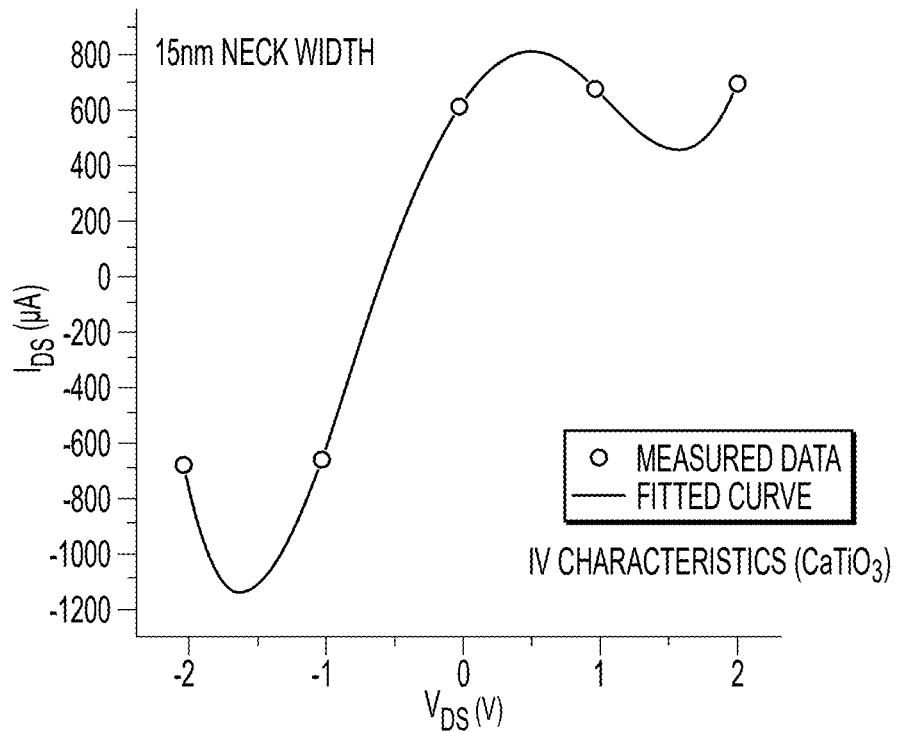
FIG. 10F is a chart showing current-voltage characteristics for a calcium titanate diode with a neck width of 15 nm.
Figure 10G:
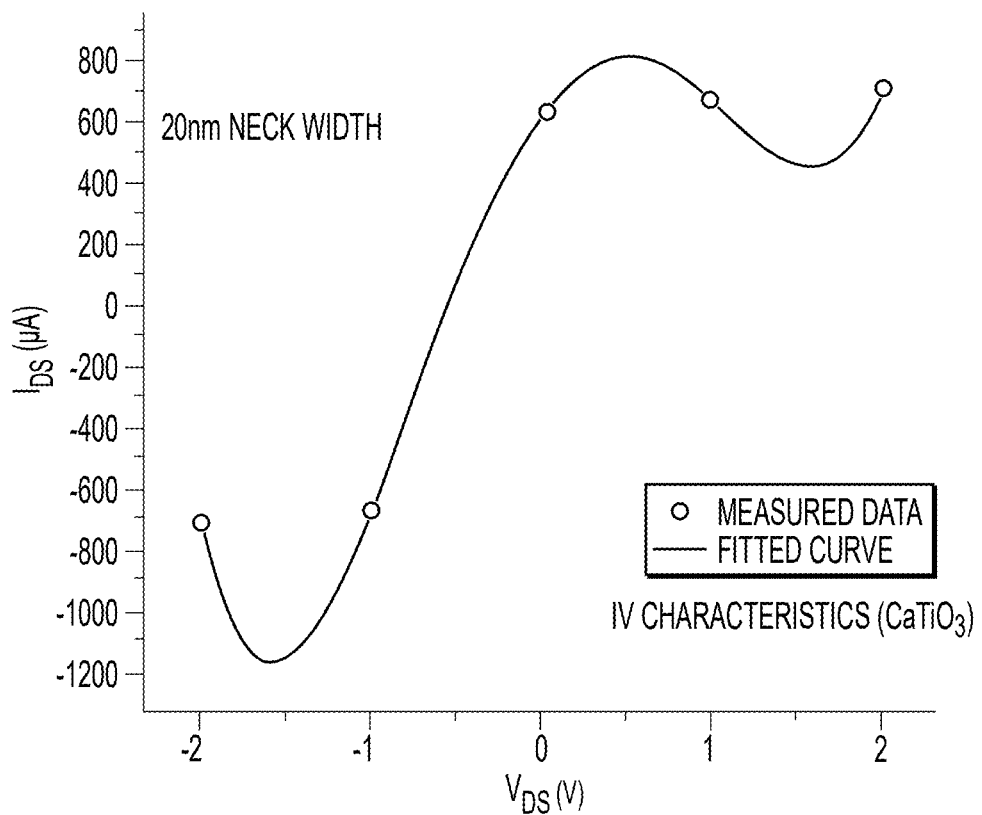
FIG. 10G is a chart showing current-voltage characteristics for a calcium titanate diode with a neck width of 20 nm.
Figure 10H:
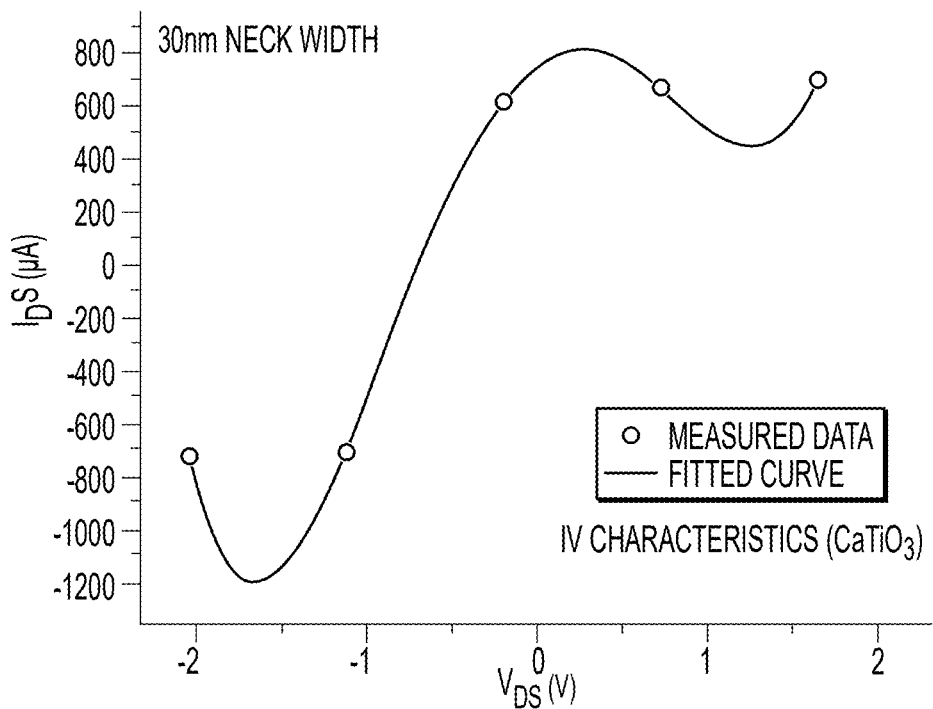
FIG. 10H is a chart showing current-voltage characteristics for a calcium titanate diode with a neck width of 30 nm.
Figure 10I:
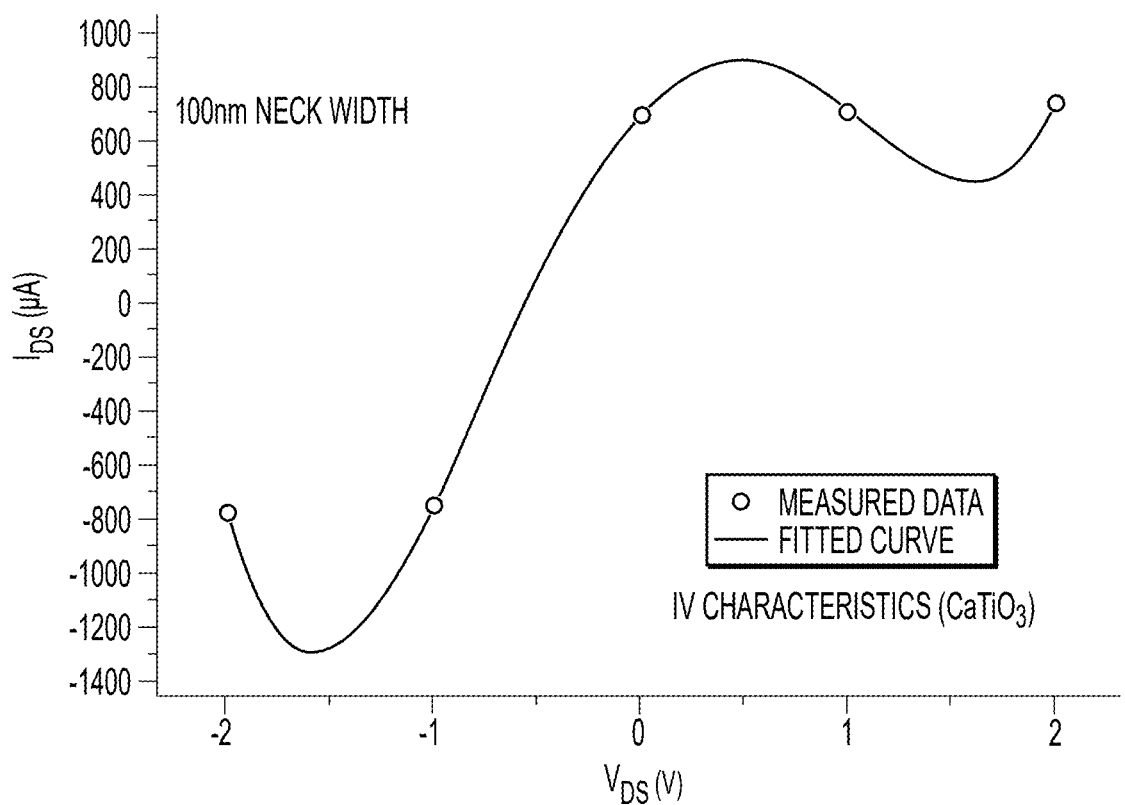
FIG. 10I is a chart showing current-voltage characteristics for a calcium titanate diode with a neck width of 100 nm.
Figure 11A:
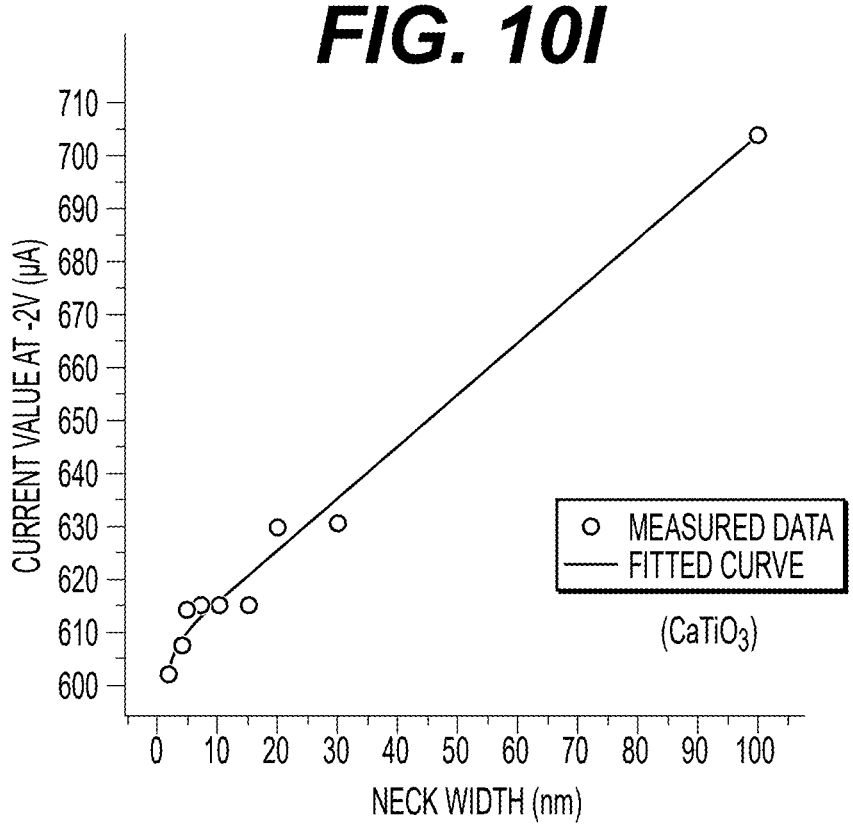
FIG. 11A is a chart showing current vs. neck width for a calcium titanate diode.
Figure 11B:
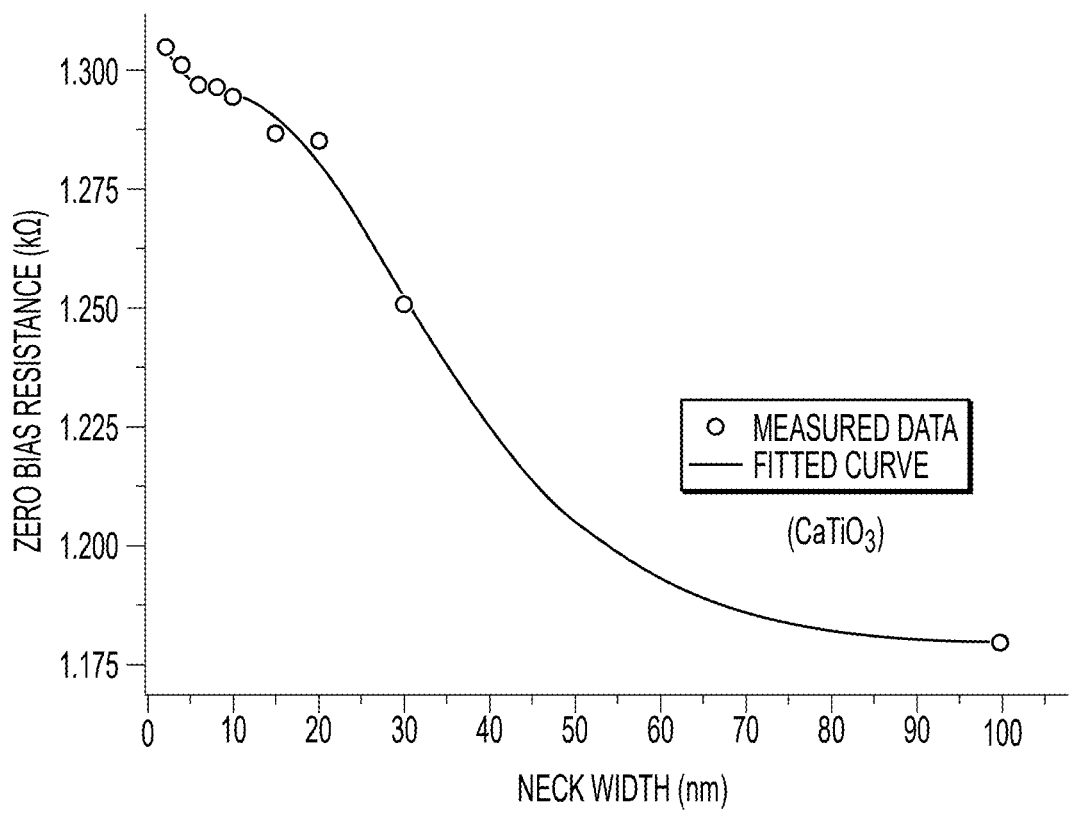
FIG. 11B is a chart showing zero-bias resistance vs. neck width for a calcium titanate diode.
Figure 11C:
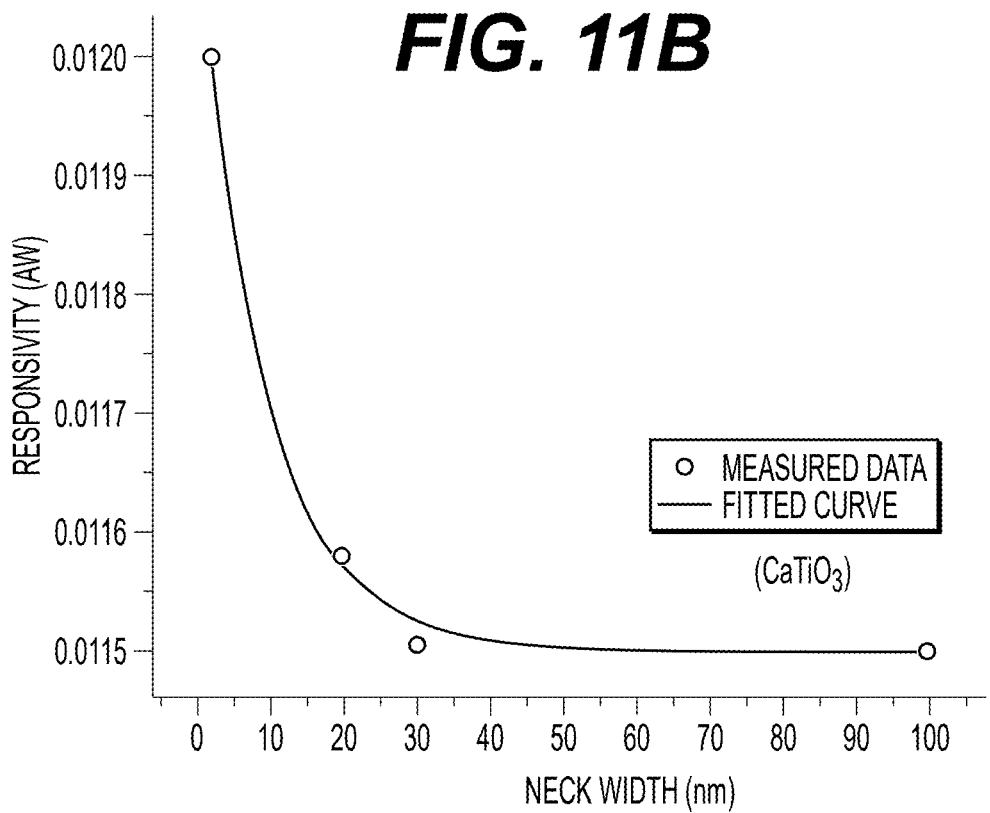
FIG. 11C is a chart showing responsivity vs. neck width for a calcium titanate diode.

With reference to FIGS. 10A-I, current-voltage (IV) characteristics for Perovskite ($CaTiO_3$) diodes are shown, with neck widths of 2 nm (FIG. 10A), 4 nm (FIG. 10B), 6 nm (FIG. 10C), 8 nm (FIG. 10D), 10 nm (FIG. 10E), 15 nm (FIG. 10F), 20 nm (FIG. 10G), 30 nm (FIG. 10H), and 100 nm (FIG. 10I). Perovskite ($CaTiO_3$), or Calcium titanate, is an inorganic compound with the chemical formula $CaTiO_3$. It is called perovskite as a mineral after Russian mineralogist Lev Perovski. With reference to FIGS. 11A-C, exponential fitted curves are shown for the simulation of a geometric diode of Perovskite ($CaTiO_3$) showing current vs. neck width (FIG. 11A), zero-bias resistance vs. neck width (FIG. 11B) and responsivity vs. neck width (FIG. 11C). The results of the analysis indicate that Perovskite ($CaTiO_3$), with a mean free path of approximately 130 nm, shows the highest current densities and superior rectification performance due to its enhanced ballistic transport properties and exceptional photovoltaic capabilities.

Figure 12A:
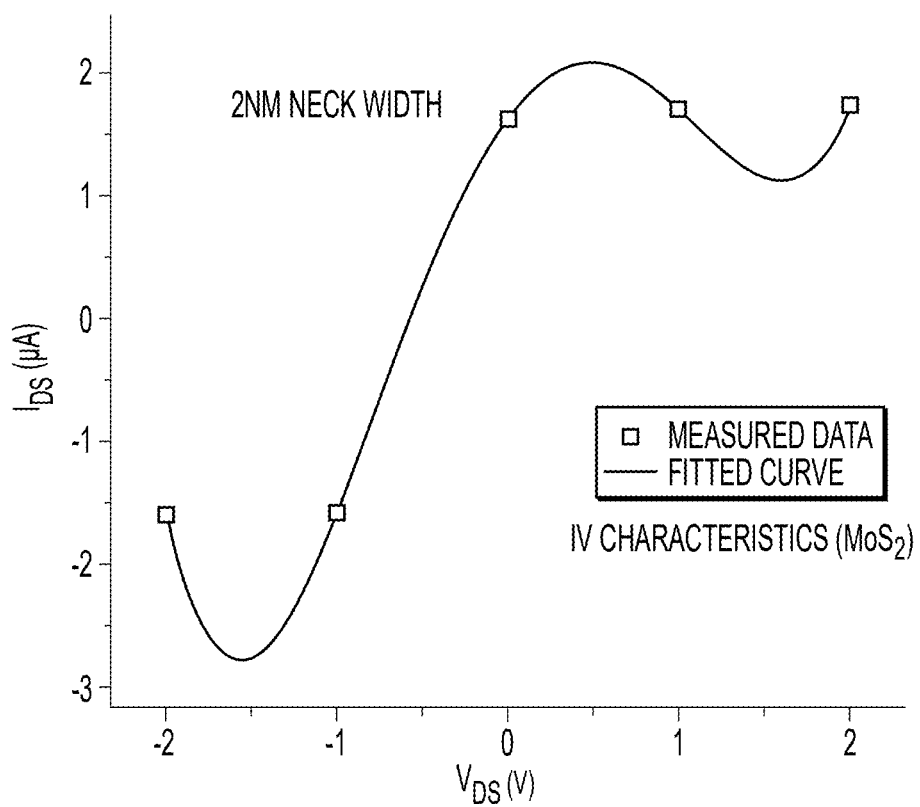
FIG. 12A is a chart showing current-voltage characteristics for a molybdenum disulfide diode with a neck width of 2 nm.
Figure 12B:
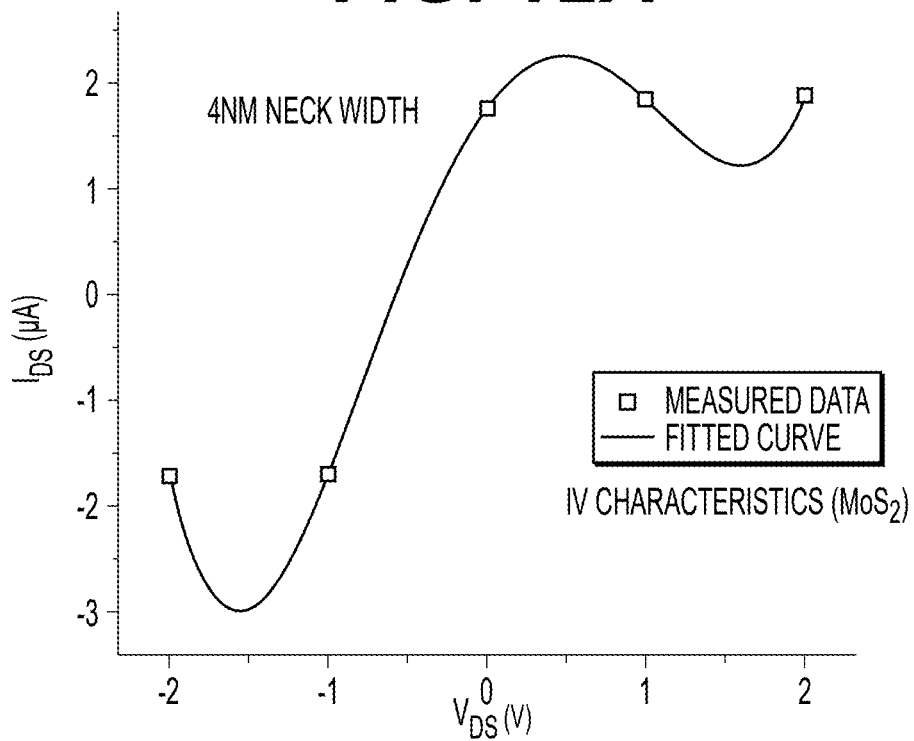
FIG. 12B is a chart showing current-voltage characteristics for a molybdenum disulfide diode with a neck width of 4 nm.
Figure 12C:
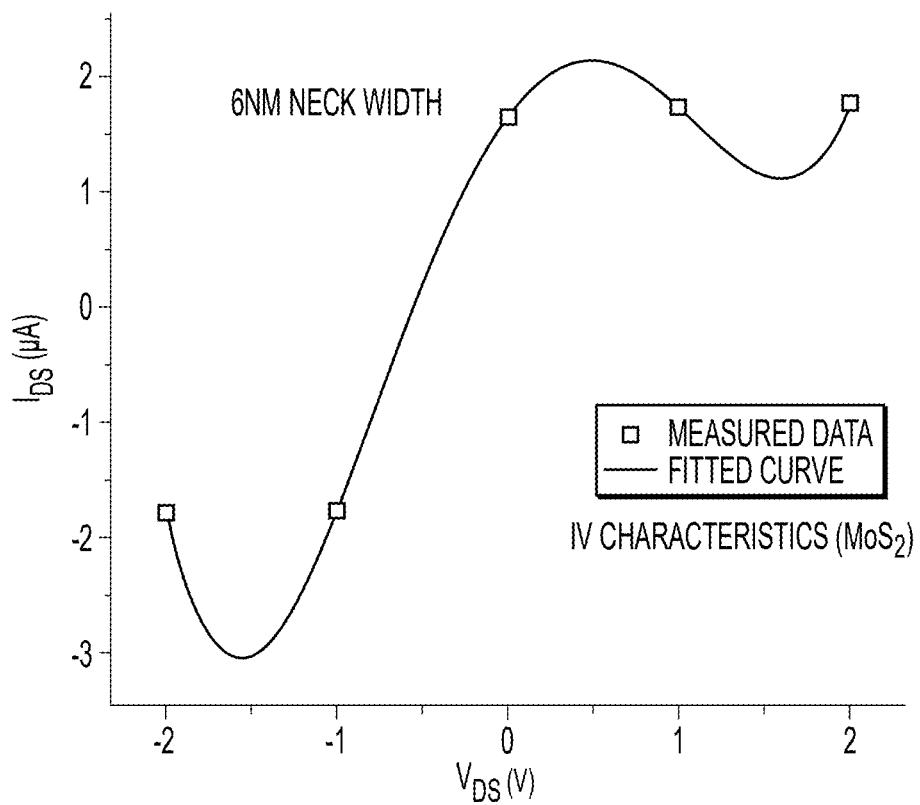
FIG. 12C is a chart showing current-voltage characteristics for a molybdenum disulfide diode with a neck width of 6 nm.
Figure 12D:
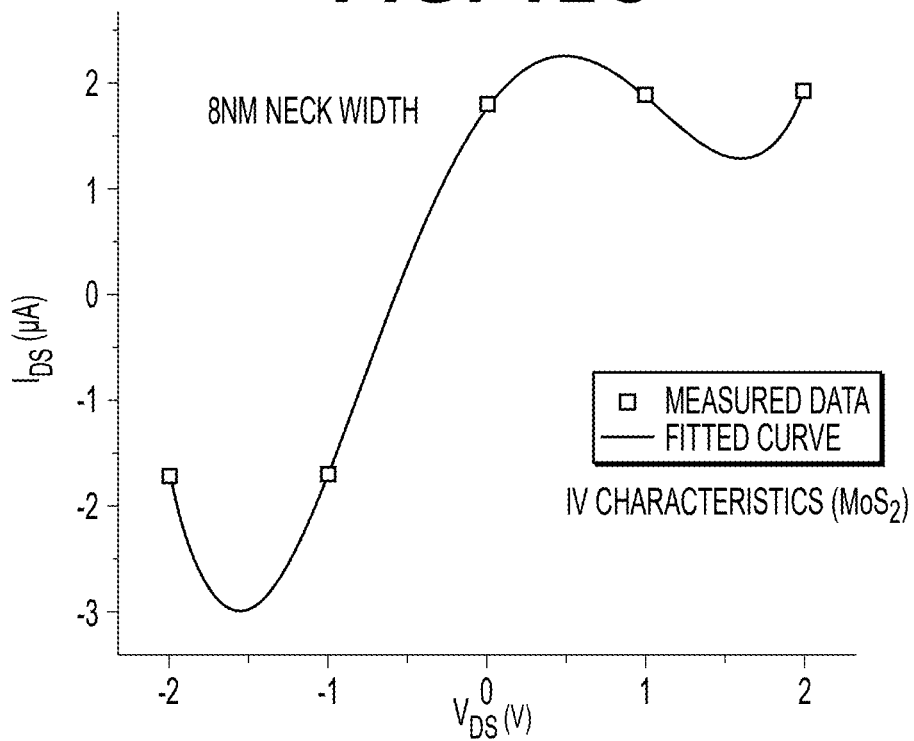
FIG. 12D is a chart showing current-voltage characteristics for a molybdenum disulfide diode with a neck width of 8 nm.
Figure 12E:
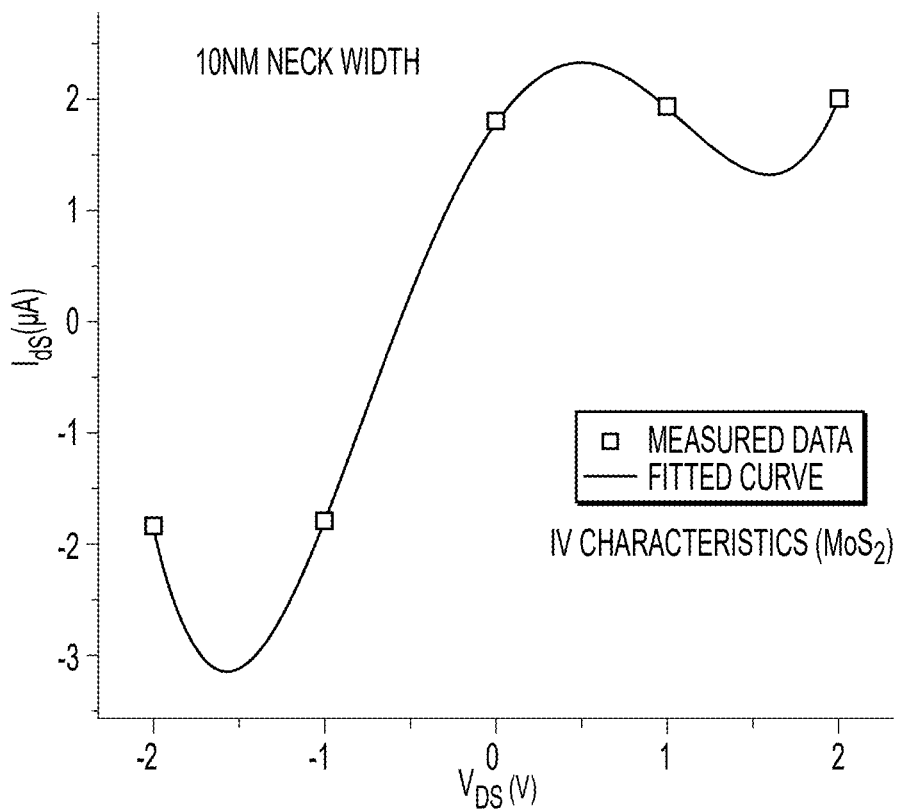
FIG. 12E is a chart showing current-voltage characteristics for a molybdenum disulfide diode with a neck width of 10 nm.
Figure 12F:
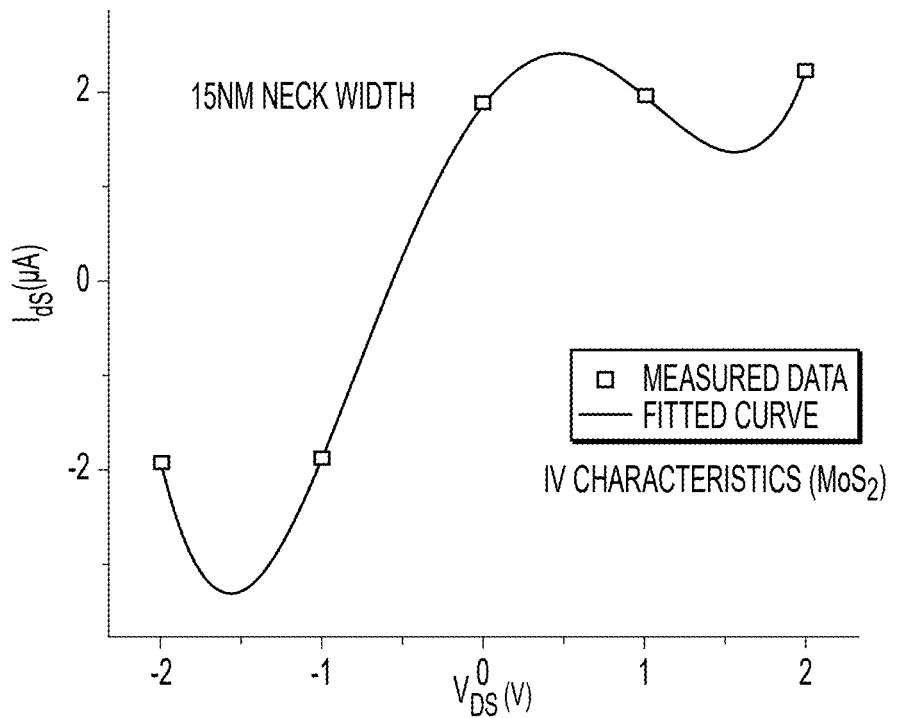
FIG. 12F is a chart showing current-voltage characteristics for a molybdenum disulfide diode with a neck width of 15 nm.
Figure 12G:
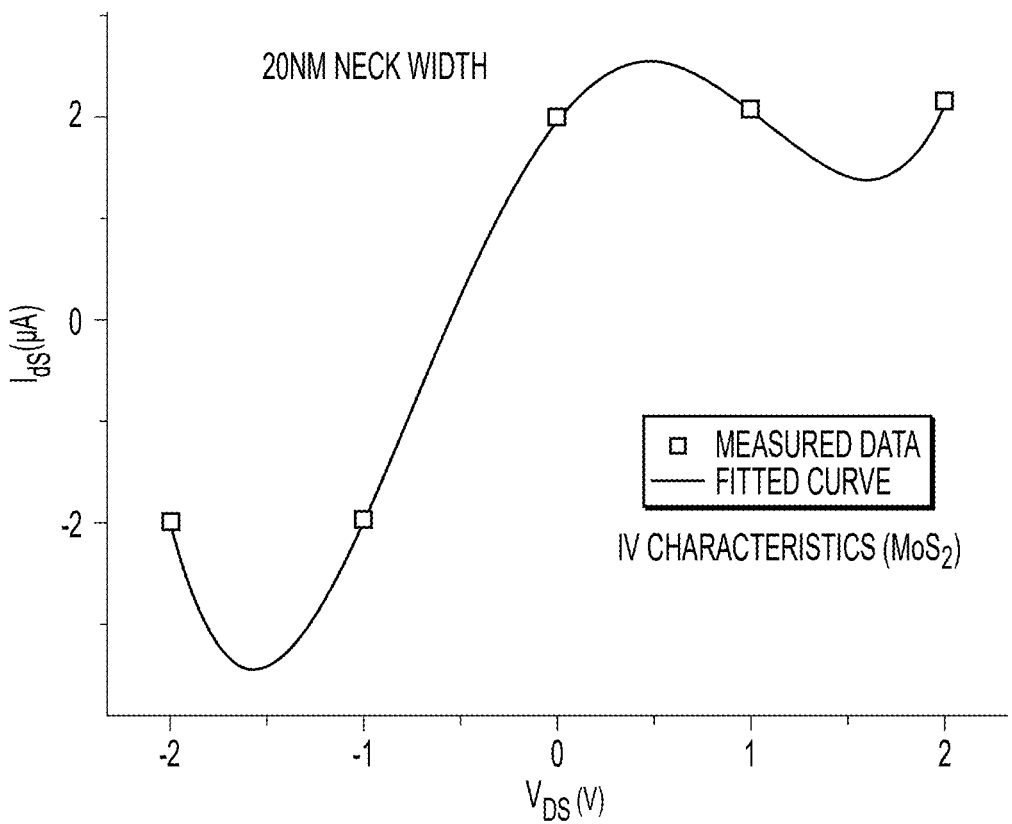
FIG. 12G is a chart showing current-voltage characteristics for a molybdenum disulfide diode with a neck width of 20 nm.
Figure 12H:
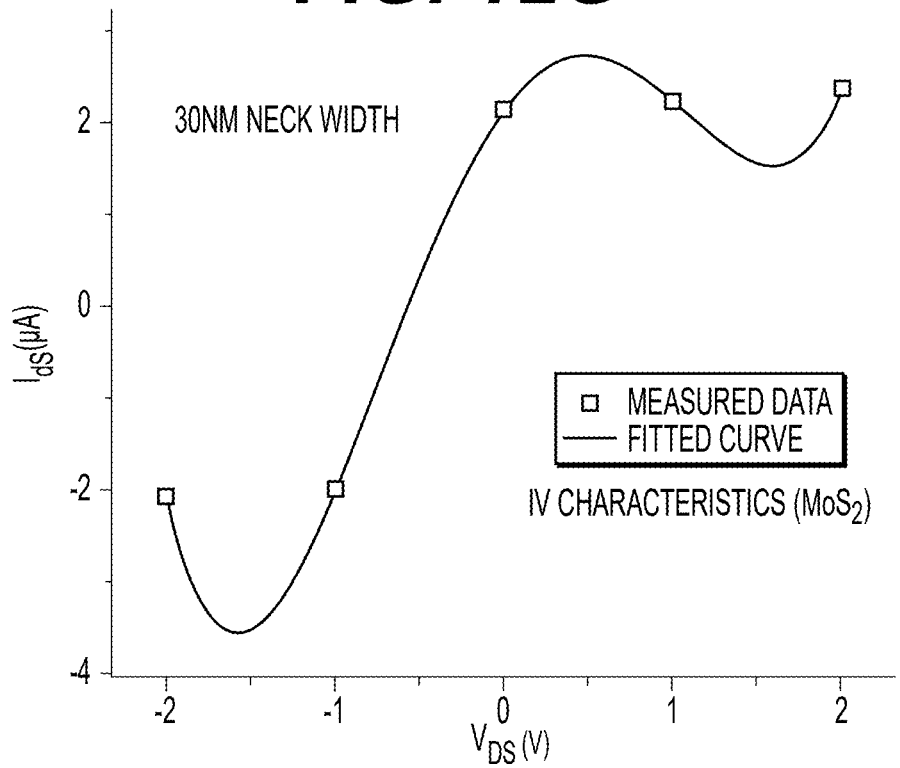
FIG. 12H is a chart showing current-voltage characteristics for a molybdenum disulfide diode with a neck width of 30 nm.
Figure 12I:
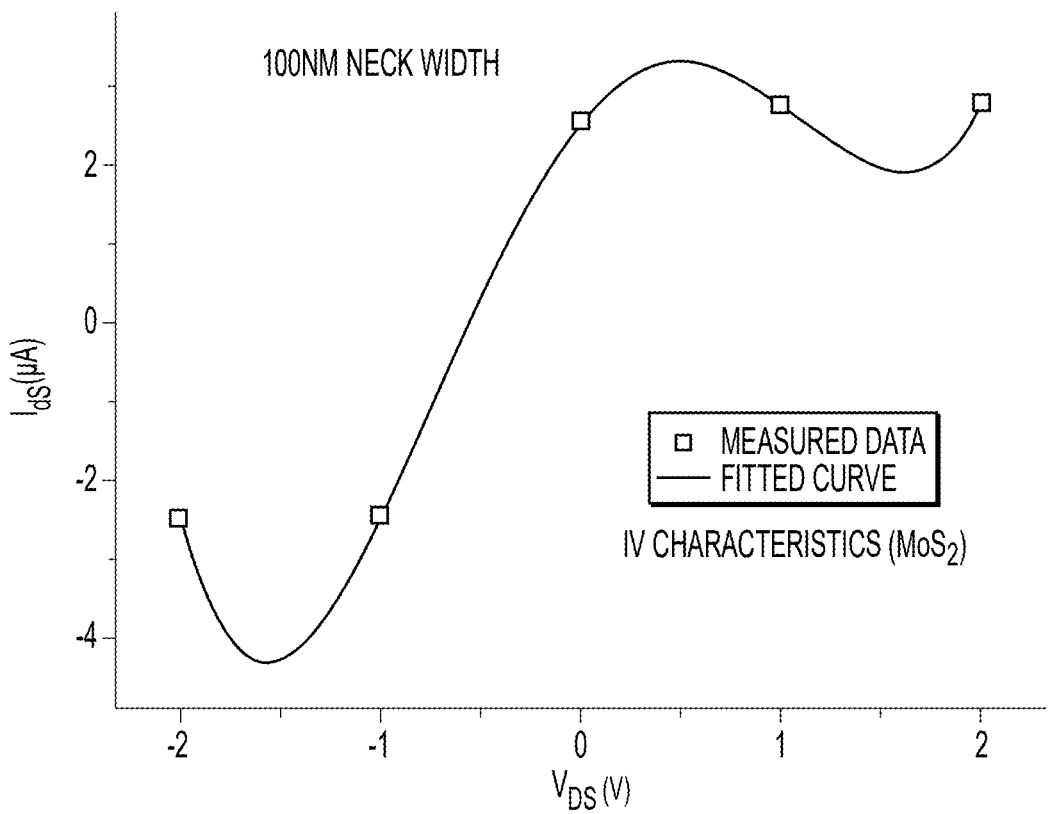
FIG. 12I is a chart showing current-voltage characteristics for a molybdenum disulfide diode with a neck width of 100 nm.
Figure 13A:
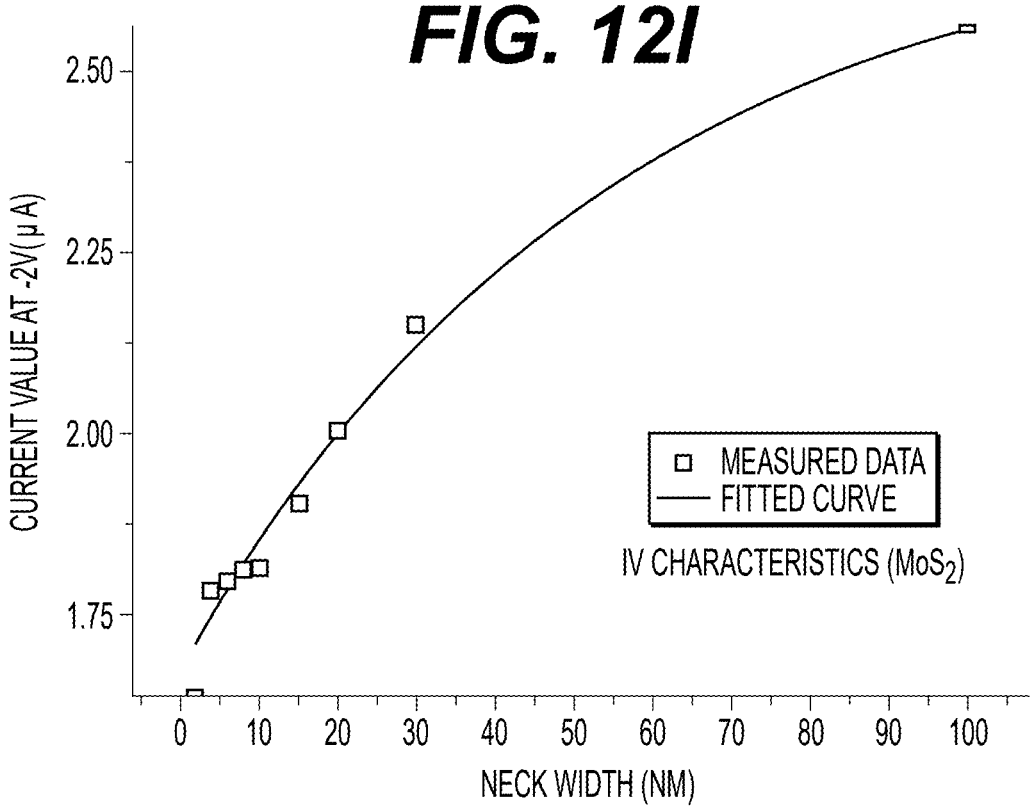
FIG. 13A is a chart showing current vs. neck width for a molybdenum disulfide diode.
Figure 13B:
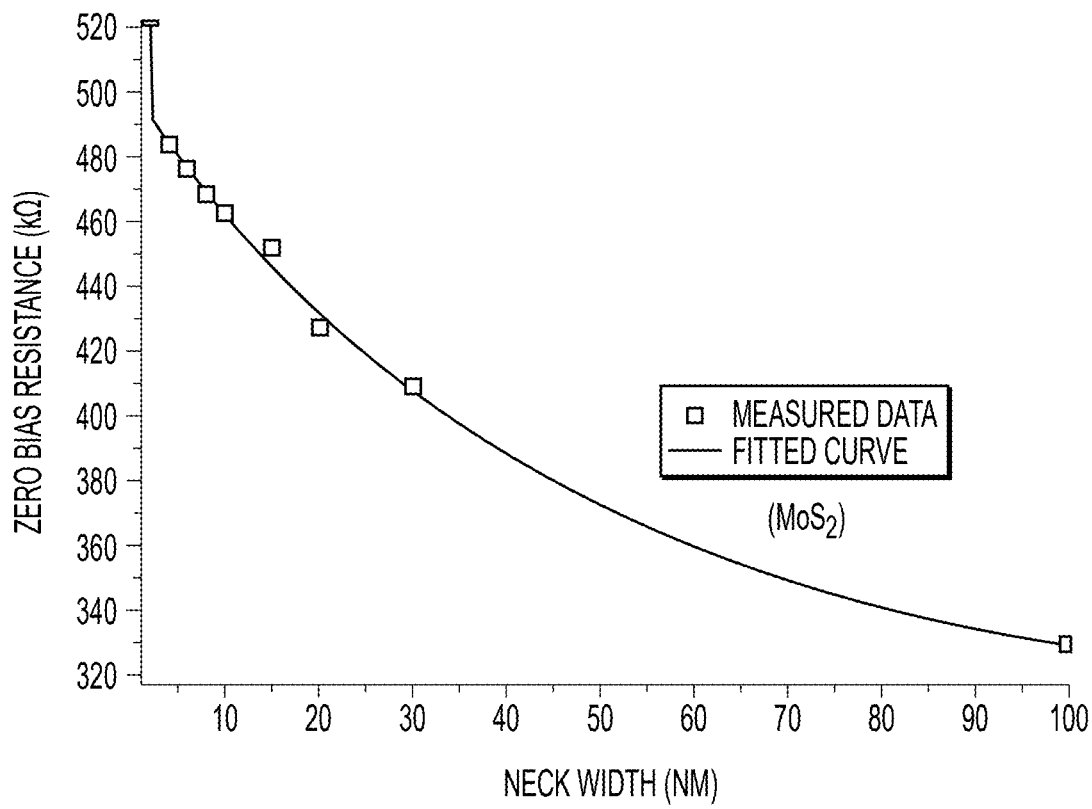
FIG. 13B is a chart showing zero-bias resistance vs. neck width for a molybdenum disulfide diode.
Figure 13C:
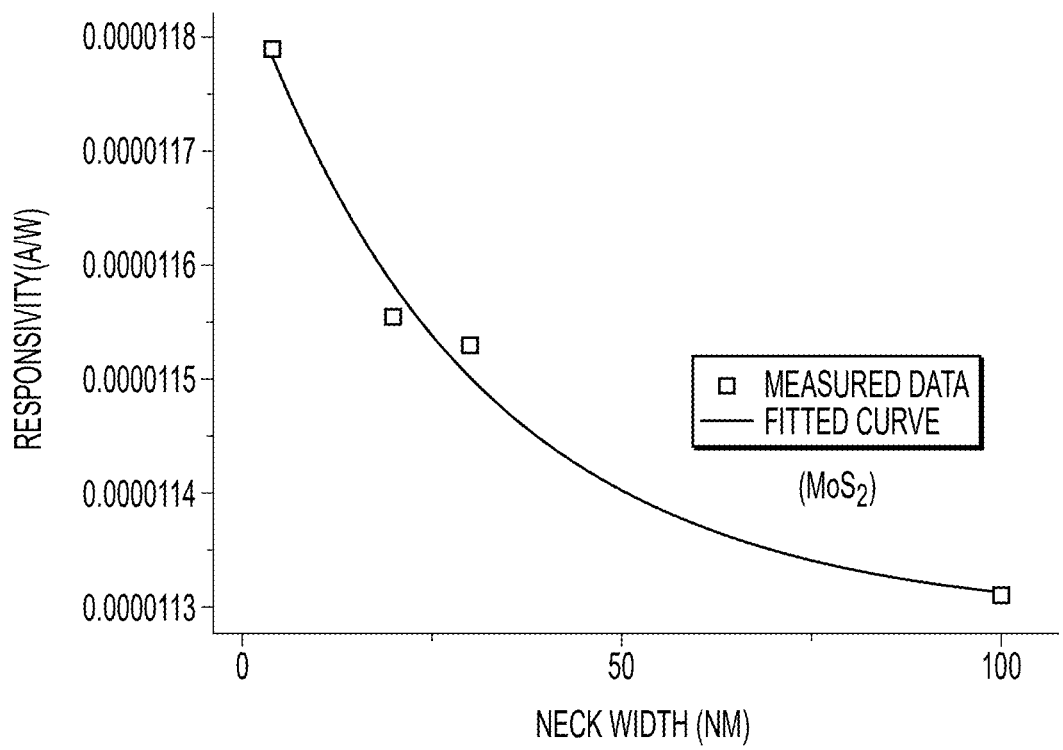
FIG. 13C is a chart showing responsivity vs. neck width for a molybdenum disulfide diode.

With reference to FIGS. 12A-I, current-voltage (IV) characteristics for Molybdenum Disulfide ($MoS_2$) diodes are shown, with neck widths of 2 nm (FIG. 12A), 4 nm (FIG. 12B), 6 nm (FIG. 12C), 8 nm (FIG. 12D), 10 nm (FIG. 12E), 15 nm (FIG. 12F), 20 nm (FIG. 12G), 30 nm (FIG. 12H), and 100 nm (FIG. 12I). Molybdenum Disulfide was chosen for analysis due to its demonstration of a direct bandgap and moderate mean free path, thus providing balanced performance in terms of rectification efficiency and current output. With reference to FIGS. 13A-C, exponential fitted curves are shown for the simulation of a geometric diode of Molybdenum Disulfide showing current vs. neck width (FIG. 13A), zero-bias resistance vs. neck width (FIG. 13B) and responsivity vs. neck width (FIG. 13C). Results of the analysis indicate that Molybdenum Disulfide ($MoS_2$), with a mean free path of approximately 20 nm, provides moderate performance with efficient charge transport and low resistance, suitable for balancing performance and energy harvesting needs.

Figure 14A:
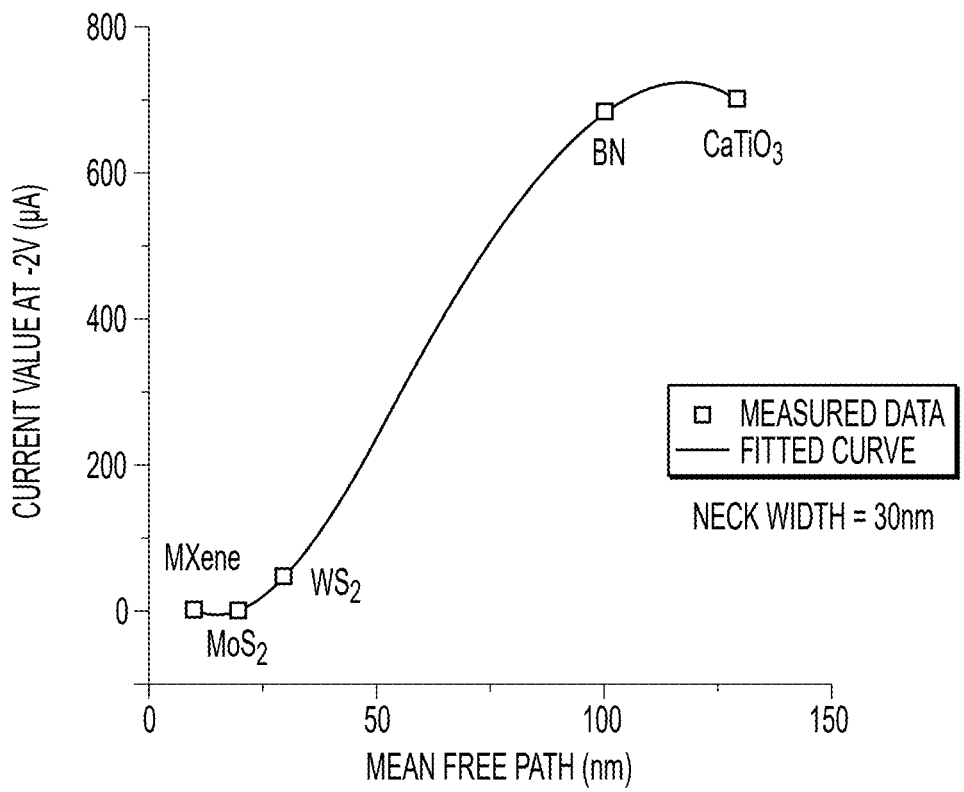
FIG. 14A is a chart showing current value at 2V vs. mean free path length for different diode materials having a neck width of 30 nm.
Figure 14B:
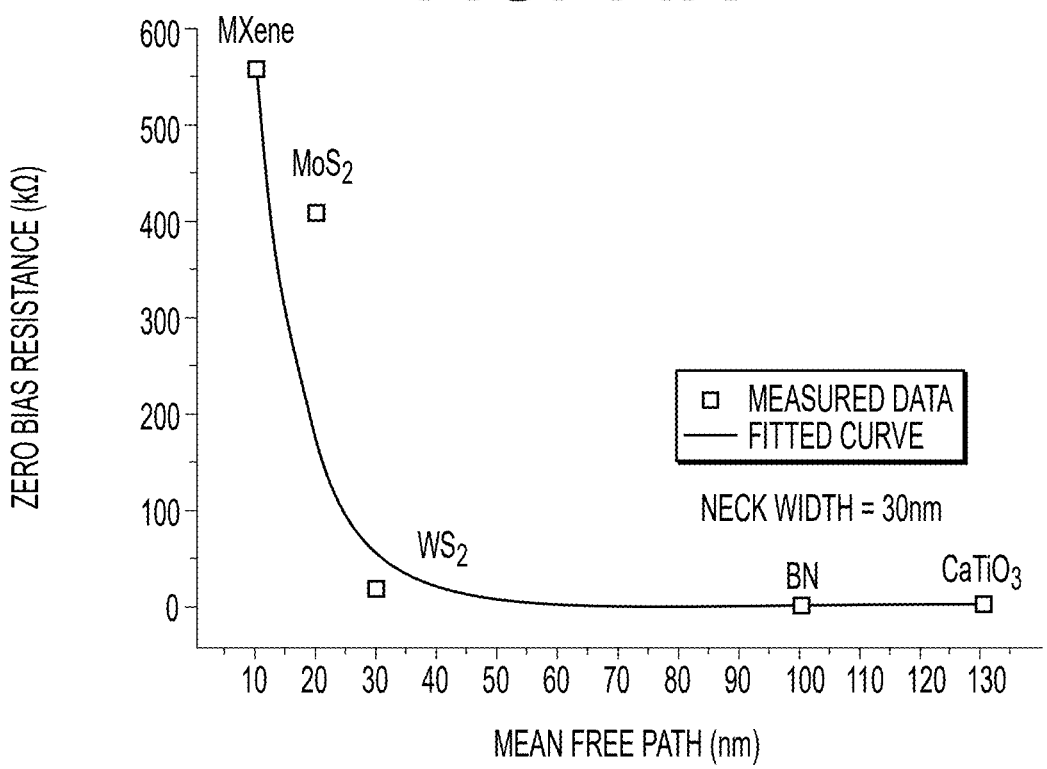
FIG. 14B is a chart showing zero-bias resistance vs. mean free path length for different diode materials having a neck width of 30 nm.
Figure 14C:
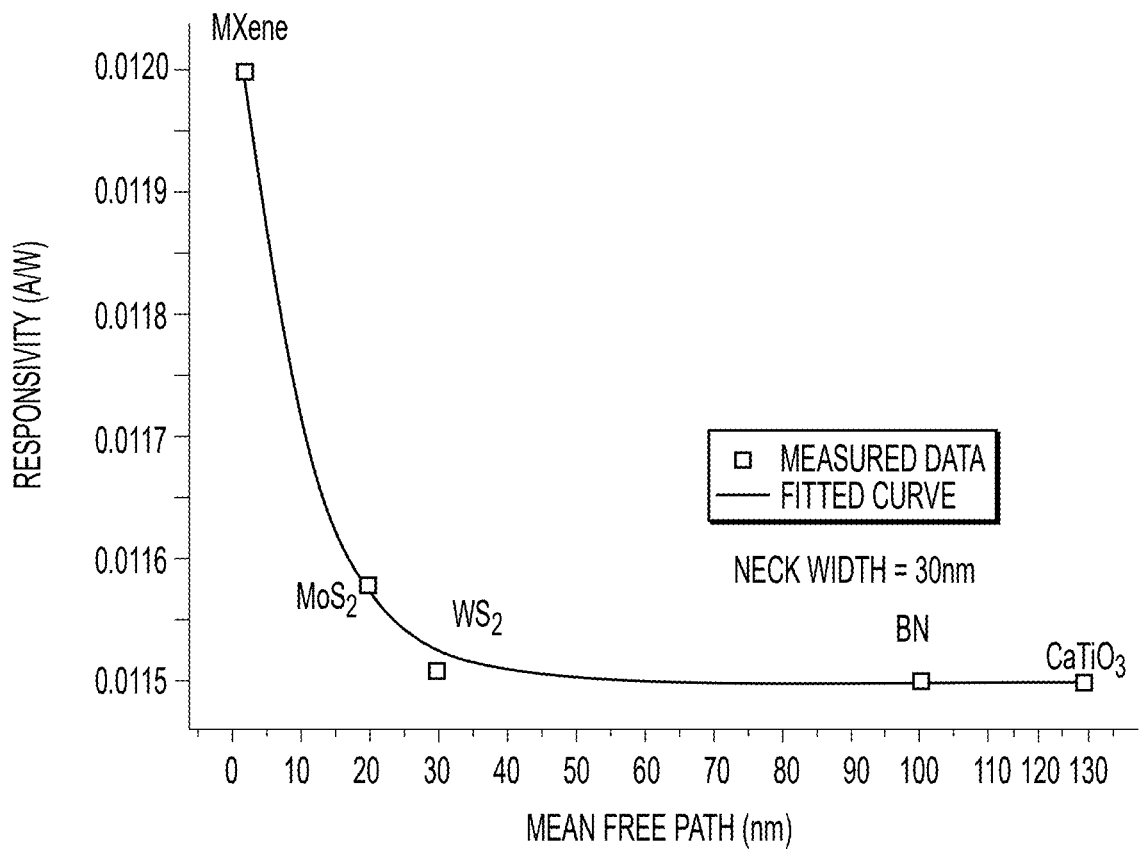
FIG. 14C is a chart showing responsivity vs. mean free path length for different diode materials having a neck width of 30 nm.

With reference to FIGS. 14A-C, charts are provided showing results of the simulation for the various materials analyzed: tungsten disulfide ($WS_2$), MXene, boron nitride (BN), perovskite ($CaTiO_3$), and molybdenum disulfide ($MoS_2$), using a neck width of 30 nm. FIG. 14A shows results of the current at 2V for the various mean free paths of the different materials. FIG. 14B provides a comparison of the zero-bias resistance vs. mean free path of the different materials for a neck width of 30 nm. FIG. 14C provides a comparison of responsivity vs. mean free path of the different materials for a neck width of 30 nm.

Results—Neck Width Vs. Current

The results of the studies on the different materials, shown in the charts of FIGS. 4A-14C provide insights into the use of the materials for energy harvesting purposes. With regards to neck width and current, as the neck width increases from 2 nm to 100 nm, the current increases for all materials due to the larger conductive pathways allowing more charge carriers to pass through the neck. Perovskite ($CaTiO_3$) exhibits the highest current densities, particularly at larger neck widths, due to its long mean free path, making it ideal for high-current applications. Boron Nitride (BN) follows with significant current flow, while tungsten disulfide ($WS_2$) and molybdenum disulfide ($MoS_2$) show moderate current densities. MXene, despite its conductivity, shows the lowest current densities due to frequent electron scattering at narrower neck widths.

Neck Width vs. Zero-Bias Resistance

Zero-bias resistance decreases as neck width increases. Perovskite ($CaTiO_3$) and Boron Nitride (BN) show the lowest zero-bias resistance at all neck widths, with Perovskite ($CaTiO_3$) being the most efficient due to its long mean free path and excellent transport properties. MXene demonstrates the highest zero-bias resistance, particularly at narrower neck widths, as its short mean free path results in more scattering and higher resistance. Tungsten Disulfide ($WS_2$) and Molybdenum Disulfide ($MoS_2$) offer moderate zero-bias resistance, striking a balance between low resistance and efficient charge transport.

Neck Width Vs. Responsivity

Responsivity, a measure of how well the diode responds to input power, is associated with non-linearity of the diode's response. High responsivity indicates strong non-linear behavior, while responsivity decreases as the neck width widens, which provides a drawback. Narrower neck widths enhance ballistic transport of charge carriers, leading to higher responsivity and improved non-linear characteristics. Perovskite exhibits the highest responsivity, reflecting its excellent ballistic transport capabilities at narrow neck widths, thus showcasing strong non-linear behavior. Boron nitride (BN) also exhibits a considerable amount of non-linearity, benefiting from favorable transport properties that contribute to its performance. MXene and molybdenum disulfide demonstrate lower responsivity due to increased scattering and shorter mean free paths, which limit their non-linear behavior at narrower neck widths. Tungsten disulfide offers a balance with moderate responsivity and rectification efficiency, making it a viable option for applications where both current and responsivity are important, despite some limitations in non-linearity.

Materials with the highest mean free paths, such as perovskite and BN, ensure ballistic transport even at higher neck widths, resulting in high current densities and low zero-bias resistances. This property also reduces fabrication constraints, as effective ballistic transport is maintained despite increased neck widths. Conversely, while MXene is a linear material, it has limitations such as low current densities and higher zero-bias resistances, along with challenges in fabrication. Thus, a trade-off exists, where molybdenum disulfide and tungsten disulfide offer a balance between linearity, current densities, and zero-bias resistances, making them suitable options for various applications.

It is to be understood that the rectenna with a geometric diode and bow tie antenna and methods of use thereof are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A rectenna comprising:
a geometric diode, wherein the geometric diode includes a start portion and end portion, and a neck portion joining the start portion and end portion, wherein the geometric diode tapers laterally inward at the neck portion between the start portion and the end portion, the neck portion defining the narrowest part of the geometric diode;
an antenna, the antenna including first and second halves forming a bow-tie shape, the first and second halves including an outer end and an inner end, wherein the outer ends taper laterally inward to the inner ends, and wherein the inner ends of the first and second halves of the antenna contact respective laterally opposite sides of the neck portion of the geometric diode.

2. The rectenna as recited in claim 1, wherein the inner ends of the antenna contact respective laterally opposite sides of the geometric diode at the at the narrowest part of the geometric diode.

3. The rectenna of claim 1, wherein the antenna is formed of gold.

4. The rectenna of claim 1, wherein the geometric diode is formed of tungsten disulfide.

5. The rectenna of claim 1, wherein the geometric diode is formed of a nanomaterial composed of transition metal carbides, nitrides, or carbonitrides.

6. The rectenna of claim 1, wherein the geometric diode is formed of boron nitride.

7. The rectenna of claim 1, wherein the geometric diode is formed of calcium titanate.

8. The rectenna of claim 1, wherein the geometric diode is formed of molybdenum disulfide.

9. The rectenna of claim 1, wherein the bow-tie antenna is formed of gold and the geometric diode is formed of a material selected from the group consisting of tungsten disulfide, boron nitride, calcium titanate, molybdenum disulfide, or a nanomaterial composed of transition metal carbides, nitrides, or carbonitrides.

10. A method of harvesting energy, comprising:
providing an antenna having a bow-tie shape;
providing a geometric diode,
wherein opposing center points of the antenna contact laterally opposite sides of a neck portion of a geometric diode, wherein the geometric diode includes a start portion, an end portion, and the neck portion, wherein the geometric diode tapers laterally inward at the neck portion between the start portion and the end portion, the neck portion defining the narrowest part of the geometric diode; and
harvesting electromagnetic energy through the antenna.

11. The method of harvesting energy according to claim 10, wherein the electromagnetic energy is infrared (RF) radiation (300 GHz to 430 THz).

12. The method of harvesting energy according to claim 10, wherein the electromagnetic energy is microwave radiation (300 MHz to 300 GHz).

13. The method of harvesting energy according to claim 10, wherein the electromagnetic energy is terahertz radiation (100 GHz-10 THz).

14. The method of harvesting energy according to claim 10, wherein the geometric diode is formed of gold.

15. The method of harvesting energy according to claim 10, wherein the geometric diode formed of tungsten disulfide.

16. The method of harvesting energy according to claim 10, wherein the geometric diode is formed of a two-dimensional nanomaterial composed of transition metal carbides, nitrides, or carbonitrides.

17. The method of harvesting energy according to claim 10, wherein the geometric diode is formed of boron nitride.

18. The method of harvesting energy according to claim 10, wherein the geometric diode is formed of calcium titanate.

19. The method of harvesting energy according to claim 10, wherein the geometric diode is formed of molybdenum disulfide.

20. The method of harvesting energy according to claim 10, wherein the antenna is formed of gold and the geometric diode is formed of tungsten disulfide, boron nitride, calcium titanate, molybdenum disulfide, or a nanomaterial composed of transition metal carbides, nitrides, or carbonitrides.

* * * * *